(12) United States Patent
Chang et al.

(10) Patent No.: US 9,302,258 B2
(45) Date of Patent: Apr. 5, 2016

(54) COMPLEX COMPRISING CRYSTALLINE HYBRID NANOPOROUS MATERIAL POWDER

(75) Inventors: Jong-San Chang, Dajeon (KR); U-Hwang Lee, Gyeonggi-do (KR); Young Kyu Hwang, Dajeon (KR); Dong Won Hwang, Gyeonggi-do (KR); You-Kyong Seo, Busan (KR); Ji Sun Lee, Busan (KR); Ji Woong Yoon, Dajeon (KR); Kyu Eun Shim, Dajeon (KR)

(73) Assignee: KOREA RESEARCH INSTITUTE OF CHEMICAL TECHNOLOGY, Daejeon (KR)

(*) Notice: Subject to any disclaimer, the term of this patent is extended or adjusted under 35 U.S.C. 154(b) by 221 days.

(21) Appl. No.: 14/238,917

(22) PCT Filed: Aug. 14, 2012

(86) PCT No.: PCT/KR2012/006488
§ 371 (c)(1),
(2), (4) Date: Jun. 9, 2014

(87) PCT Pub. No.: WO2013/025046
PCT Pub. Date: Feb. 21, 2013

(65) Prior Publication Data
US 2014/0287235 A1    Sep. 25, 2014

(30) Foreign Application Priority Data

Aug. 16, 2011 (KR) .................. 10-2011-0081272

(51) Int. Cl.
| | |
|---|---|
| *B01J 31/06* | (2006.01) |
| *C01G 23/00* | (2006.01) |
| *C01G 25/00* | (2006.01) |
| *C01G 31/00* | (2006.01) |
| *C01G 37/00* | (2006.01) |
| *C01G 49/00* | (2006.01) |
| *C01G 3/00* | (2006.01) |
| *B01J 20/26* | (2006.01) |
| *B01J 20/30* | (2006.01) |
| *B01J 20/22* | (2006.01) |
| *B01J 20/28* | (2006.01) |

(52) U.S. Cl.
CPC ............ *B01J 31/06* (2013.01); *B01J 20/226* (2013.01); *B01J 20/26* (2013.01); *B01J 20/2803* (2013.01); *B01J 20/28019* (2013.01); *B01J 20/28057* (2013.01); *B01J 20/28069* (2013.01); *B01J 20/28078* (2013.01); *B01J 20/3028* (2013.01); *B01J 20/3064* (2013.01); *C01G 3/006* (2013.01); *C01G 23/002* (2013.01); *C01G 25/006* (2013.01); *C01G 31/006* (2013.01); *C01G 37/006* (2013.01); *C01G 49/009* (2013.01); *C01P 2002/72* (2013.01); *C01P 2004/03* (2013.01); *C01P 2004/32* (2013.01); *C01P 2004/61* (2013.01); *C01P 2006/12* (2013.01); *C01P 2006/14* (2013.01); *C01P 2006/16* (2013.01); *Y02P 20/129* (2015.11); *Y10T 428/2982* (2015.01)

(58) Field of Classification Search
CPC ........ B01J 31/06; B01J 20/26; B01J 20/3064; B01J 20/226; B01J 20/2803; B01J 20/28069; B01J 20/3028; B01J 20/28057; B01J 20/28078; B01J 28/019; C01G 23/002; C01G 25/006; C01G 31/006; C01G 37/006; C01G 49/009; C01G 3/006; Y10T 428/2982; Y02P 20/129
USPC .................... 428/402; 502/159, 402; 252/194
See application file for complete search history.

(56) References Cited

U.S. PATENT DOCUMENTS

| | | | |
|---|---|---|---|
| 6,893,564 B2 | 5/2005 | Mueller et al. | |
| 7,524,444 B2 | 4/2009 | Hesse et al. | |
| 7,658,784 B2 * | 2/2010 | Fritsch et al. | ..... 95/45 |

(Continued)

FOREIGN PATENT DOCUMENTS

| | | | |
|---|---|---|---|
| KR | 10-2010-0088619 | * | 8/2010 |
| KR | 1020100088619 A | | 8/2010 |

(Continued)

OTHER PUBLICATIONS

Jasmina Hafizovic Cavka, et al; "A New Zirconium Inorganic Building Brick Forming Metal Organic Frameworks with Exceptional Stability", Journal American Chemical Society, vol. 130, pp. 13850-13851, Published on Web Sep. 26, 2008.

(Continued)

*Primary Examiner* — Leszek Kiliman
(74) *Attorney, Agent, or Firm* — Ladas & Parry LLP

(57) ABSTRACT

The present invention relates to a complex and a method for manufacturing same, the complex comprising: at least one crystalline hybrid nanoporous material powder, in which a metal ion, or a metal ion cluster to which oxygen is bound, and an organic ligand, or the organic ligand and a negative ion ligand are in a coordinate covalent bond; and at least one organic polymer additive, or at least one organic polymer additive and an inorganic additive, wherein the shape of the complex is spherical or pseudo-spherical, the size of the complex is 0.1 to 100 mm, a total volume of pores is 5 or more volume % based on the sum of a total volume of nanoporous material having a size of at most 10 nm and a total volume of pores having a size of at least 0.1 µm, and wherein a non-surface value per weight ($m^2/g$) of the complex as at least 83% of a non-surface value per weight ($m^2/g$) of the nanoporous material powder.

13 Claims, 7 Drawing Sheets

(56) References Cited

U.S. PATENT DOCUMENTS

| | | | |
|---|---|---|---|
| 7,855,299 B2 | 12/2010 | Jhung et al. | |
| 8,252,950 B2 * | 8/2012 | Hwang et al. | 556/44 |
| 8,507,399 B2 * | 8/2013 | Hwang et al. | 502/167 |
| 8,569,193 B2 * | 10/2013 | Chang et al. | 502/104 |
| 8,759,245 B2 * | 6/2014 | Chang et al. | 502/150 |
| 9,175,025 B2 * | 11/2015 | Lee et al. | |
| 2009/0048092 A1 | 2/2009 | Morinaka et al. | |
| 2010/0226991 A1 * | 9/2010 | Horcajada-Cortes et al. | 424/489 |
| 2011/0105301 A1 | 5/2011 | Wang et al. | |

FOREIGN PATENT DOCUMENTS

| | | | |
|---|---|---|---|
| WO | 2011/081779 A2 | | 7/2011 |
| WO | WO2011-081779 | * | 7/2011 |

OTHER PUBLICATIONS

Stephen S.-Y. Chui, et al; "A Chemically Functionalizable Nanoporous Material [$Cu_3(TMA)_2(H_2O)_3$]", Science; vol. 283, Feb. 19, 1999, pp. 1148-1150.

Gérard Férey, et al; "A Hybrid Solid with Giant Pores Prepared by a Combination of Targeted Chemistry, Simulation, and Powder Diffraction", Angew. Chem. Int. Ed., vol. 43, pp. 6296-6301; Article first published online: Aug. 30, 2004.

G. Férey, et al; "A Chromium Terephthalate-Based Solid with Unusually Large Pore Volumes and Surface Area", Science, vol. 309, pp. 2040-2042; Sep. 23, 2005, Corrected Nov. 18, 2005 See last page.

V. Finsy, et al; "Separation of $CO_2/CH_4$ mixtures with the MIL-53(A1) metal-organic framework", Microporous and Mesoporous Materials, vol. 120, pp. 221-227, Available online Nov. 14, 2008.

Patricia Horcajada, et al; "Synthesis and Catalytic properties of MIL-100(Fe), an iron(III) carboxylate with large pores", Chem. Communication, pp. 2820-2822; First published as an Advance Article on the web May 15, 2007.

Stuart L. James; "Metal-organic frameworks", Chem. Soc. Rev., vol. 32, pp. 276-288; First published as an Advance Article on the web Jun. 27, 2003.

Chrisophe Volkringer, et al: Synthesis, Single-Crystal X-ray Microdiffraction, and NMR Characterizations of the Giant Pore Metal-Organic Framework Aluminum Trimesate MIL-100; Chemistry of Materials Communication, vol. 21, pp. 5695-5697; Published on Web Nov. 19, 2009.

International Search Report dated Feb. 21, 2013; PCT/KR2012/006488.

* cited by examiner (a)

(b)

CuBTC Composite

MIL-100(Fe)_NF Composite

MIL-125(Ti)_NH$_2$ Composite

UiO-66(Zr)_NH$_2$ Composite

COMPLEX COMPRISING CRYSTALLINE HYBRID NANOPOROUS MATERIAL POWDER

TECHNICAL FIELD

The present invention relates to a composite containing a crystalline hybrid nanoporous material and a method for preparing thereof. More specifically, the present invention relates to a composite containing at least one crystalline hybrid nanoporous material powder and having a spherical or pseudo-spherical shape and a size of 0.1 100 mm, preferably 0.1 to 30 mm, wherein the total volume of the voids is at least 5 volume % based on the sum of the total volume of the nanopores having the size of 10 nm or smaller present in the composite and the total volume of the voids having the size of 0.1 µm or larger present in the composite; and that the specific surface area per weight ($m^2/g$) of the composite is at least 83% based on the specific surface area per weight ($m^2/g$) of the powder, and a method for preparing thereof.

BACKGROUND ART

The term "crystalline hybrid nanoporous material" used in the present invention refers to, unlike the conventional zeolite, a molecular building block which is formed by coordinating an organic ligand or an organic ligand and an anionic ligand to or with a metal ion or a metal ion cluster to which oxygen is bonded. The term of crystalline hybrid nanoporous material is also used to refer to a structural skeleton that can infinitely expand with forming a void space when the 3-dimensional framework is formed In particular, the term of crystalline hybrid nanoporous material can be defined as a porous organic-inorganic high molecular compound formed by bonding central metal ion(s) with organic ligand(s), and can mean a crystalline compound containing both organic moiety and inorganic moiety in the structural skeleton and having molecule-sized or nano-sized pores.

Recently, crystalline hybrid nanoporous materials are newly developed by the fusion of the molecular coordinate bond and the material science. Since said crystalline hybrid nanoporous materials have a high surface area and molecule-sized or nano-sized pores, they can be employed as an adsorbent, a gas-storing material, a sensor, a membrane, a functional thin film, a drug-delivering material, a catalyst, a catalyst carrier, etc. In addition, an intensive research on crystalline hybrid nanoporous materials is actively performed in recent since these materials can be used for collecting guest molecules which are smaller than the nano-pores or selectively dividing molecules depending on the size thereof by using nano-pores.

Further, the crystalline hybrid nanoporous material simultaneously contains polar parts such as metal ion and anionic ligand as well as non-polar parts such as aromatic compound group in its crystalline skeleton, by which it can possess both the hydrophilic property and the hydrophobic property.

If a crystalline hybrid nanoporous material has a permanent porosity, it can have a potential applicability in various fields, and thus, this matter has been a main concern in the fields of a catalysis, an absorbent and/or adsorbent, an ion exchange material, a material for chromatography, a storage material and a material for freshwater production, etc. Such solid porous materials can now be found in U.S. Pat. Nos. 7,855,299 and 6,893,564, etc.

However, such novel crystalline hybrid nanoporous materials are based on a skeleton or framework of metal-organic compound and are generally obtained in the form of small crystal or powder, which makes the application inconvenient because the density is low and the size is small in such form. Further, such powder form makes the recovery difficult and the deactivation and agglomeration easy. Therefore, the permeability of gas and liquid is not good, and thus, it cannot be easily utilized in most fields. In order to enable the crystalline hybrid nanoporous material to be utilized in various fields, various forms such as a composite are now considered and searched.

U.S. Pat. No. 7,524,444 and a literature [*Micropor. Mesopor. Material.* 2009, 120, 221] describe the method of converting a crystalline hybrid nanoporous material into a composite such as pellet. In said literatures, the composite is prepared by a molding step including compacting or extruding of the powder of metal-organic frameworks. However, such method has a problem that it may cause the decrease in the surface area and the porosity of the nanoporous material.

Meanwhile, conventional inorganic-type nanoporous materials can be shaped by employing an organic binder or an additive as a void-forming agent during the shaping step and then removing it by the calcination at a high temperature to generate voids between particles. However, since crystalline hybrid nanoporous materials are low in the thermal stability and thus cannot be subjected to the calcination, it is not easy to provide voids by simply adding an organic additive.

Further, since a crystalline hybrid nanoporous material has features such as the high crystallinity and high porosity on the basis of a skeleton consisting of metals and organic materials, the mechanical stability is low, the skeleton structure can be easily destroyed and the porosity features such as surface area can be easily reduced. As to the crystalline hybrid nanoporous material in which unsaturated metal sites can be easily formed in the structure during the removal of water or solvent, the preparation of a composite by compacting or extruding the powder will cause the reduction of active surface due to the loss of the unsaturated metal sites.

Therefore, the most important point in converting a crystalline hybrid nanoporous material powder to a composite having a certain shape is to minimize the deterioration of the features such as the surface area, the porosity and the active surface of the nanoporous material.

Another important point in converting a powder to a composite is the stability or the hardness of the composite. The stability of a composite is generally related to the pressure employed when shaping the composite. The hardness of a composite is closely related to the stability of the composite. A stable composite may be desirable on one hand, but on the other hand, the pressure employed when shaping the composite may reduce the surface area and the active surface.

Meanwhile, since inorganic nanoporous materials such as zeolite are based on the crystalline or amorphous skeleton consisting of metals and inorganic materials, they have a high stability but a low collectivity, and thus, it is necessary to mix them with a binder or an additive and subjected to a compacting under a mechanical pressure. The shaping of zeolite or the like by a compacting method can be found in US Patent Publication No. 2009-0048092, US Patent Publication No. 2011-0105301, etc.

Consequently, when a composite is prepared by a compacting manner, the surface area of the composite will be drastically reduced, when comparing with the surface area of the powder, by the decrease due to the amount of the binder or additive added, as well as by the decrease due to the blockage of the pore entrance, by the decrease due to the reduction of crystallinity, etc.

In the shaping of nanoporous materials, it should be noted that, since the active surface of the nanoporous materials is present at the inside the nanopores, it is important to ensure the void volume, in other words, to secure the channel or passage through which guest molecules can rapidly and smoothly penetrate from the outer surface to the inner nanopores of the shaped body. As to conventional inorganic nanoporous materials such as zeolite, they have been commonly shaped by the method for forming voids by using an organic binder, wherein the inorganic nanoporous material is mixed with an organic binder, shaped to form a composite, and then calcinated at a high temperature to remove the organic binder and to form voids.

Thus, there is still a need for a composite containing a nanoporous material powder and a method for the preparation thereof, in which the surface features of the powder can be maintained and voids can be formed when converting the powder to the composite, as well as the composite possesses a sufficient stability and the decrease of the active surface can be minimized to maximize the applicability of the composite.

DISCLOSURE OF INVENTION

Technical Problem

The propose of the present invention is to provide a composite containing of a crystalline hybrid nanoporous material powder which can maintain the stability in the structure of the nanoporous material of which mechanical strength is weaker than that of inorganic nanoporous materials, which can maintain the adsorption features of the nanoporous material powder by minimizing the reduction of the surface area of the powder, and which can be diversely utilized in various fields by securing the velocity of the material transfer and diffusion of guest molecules.

Solution to Problem

To achieve the above-described object, the present invention provides a composite which comprises a crystalline hybrid nanoporous material powder, at least one organic polymeric additive and at least one optional inorganic additive; wherein said crystalline hybrid nanoporous material powder is formed by coordinating an organic ligand and an optional anionic ligand to or with a metal ion or a metal ion cluster to which oxygen is bonded; characterized by the fact that the composite has a spherical or pseudo-spherical shape and a size of 0.1~100 mm, preferably 0.1 to 30 mm; that the total void volume of the voids is at least 5 volume % based on the sum of the total pore volume of the nanopores having the size of 10 nm or smaller in the composite and the total void volume of the voids having its size of 0.1 lull or larger in the composite; and that the specific surface area per weight ($m^2$/g) of the composite is at least 83% based on the specific surface area per weight ($m^2$/g) of the nanoporous material powder, and a method for preparing thereof.

Advantageous Effects of Invention

Since the present invention can shape a hybrid nanoporous material into a composite using a binder of high molecular compound, without using a mechanical compacting method, it is possible to maintain the skeleton flexibility of the nanoporous material and to secure superior performances compared with other shaping methods. The shaped composite of the hybrid nanoporous material obtained in the present invention has good effects such as the improvement of the hydrothermal stability, the control of surface hydrophilicity/hydrophobicity, the maintenance of the skeleton flexibility. In addition, since the above three features can provide performances which can be distinguished from and superior to the known or reported shaped bodies or shaping method of a hybrid nanoporous material, the composite containing a hybrid nanoporous material powder obtained in the present invention can exert new functions and be utilized as a novel substance which is different from the hybrid nanoporous material powder itself.

The composites comprising at least one hybrid nanoporous material powder according to the present invention can minimize the decrease in the active surface as well as can secure a sufficient dimensional stability so as maintain the existing features, to generate voids or pores and to maximize the applicability, when converting the powder into the composite. In addition, depending on the properties such as additives or functional assisting agent, etc., it is possible to derive the increase of the hydrophilicity or hydrophobicity, the change of an adsorption amount of air or organic compounds, etc.

BEST MODE FOR CARRYING OUT THE INVENTION

Figure 1:
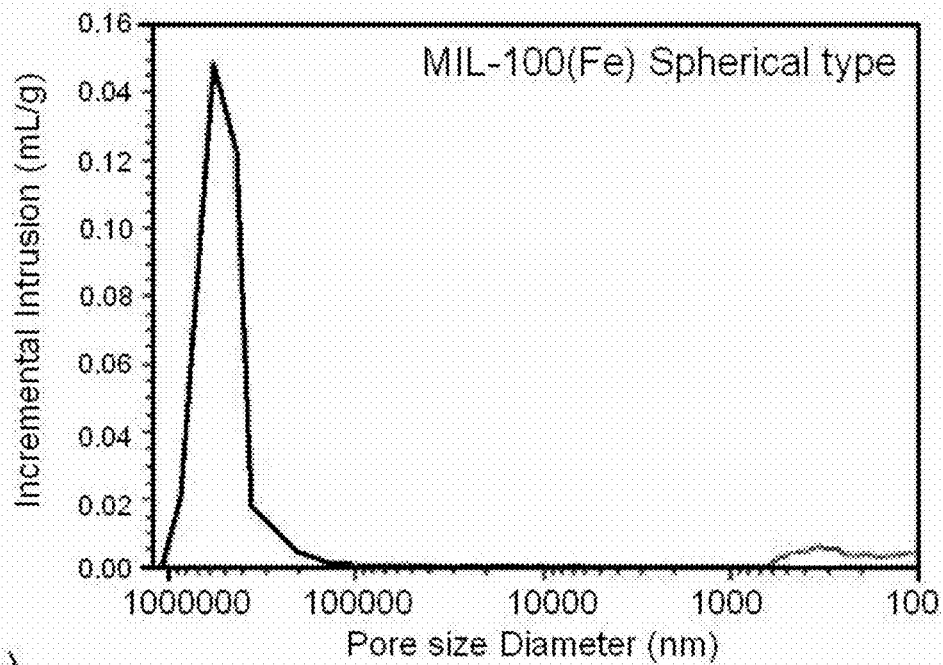
FIG. 1 represents a distribution graph of fine pores having a size of 0.1 μm or larger for (a) a spherical composite of MIL-100(Fe)_NF and (b) a pellet of MIL-100_(Fe).
Figure 1:
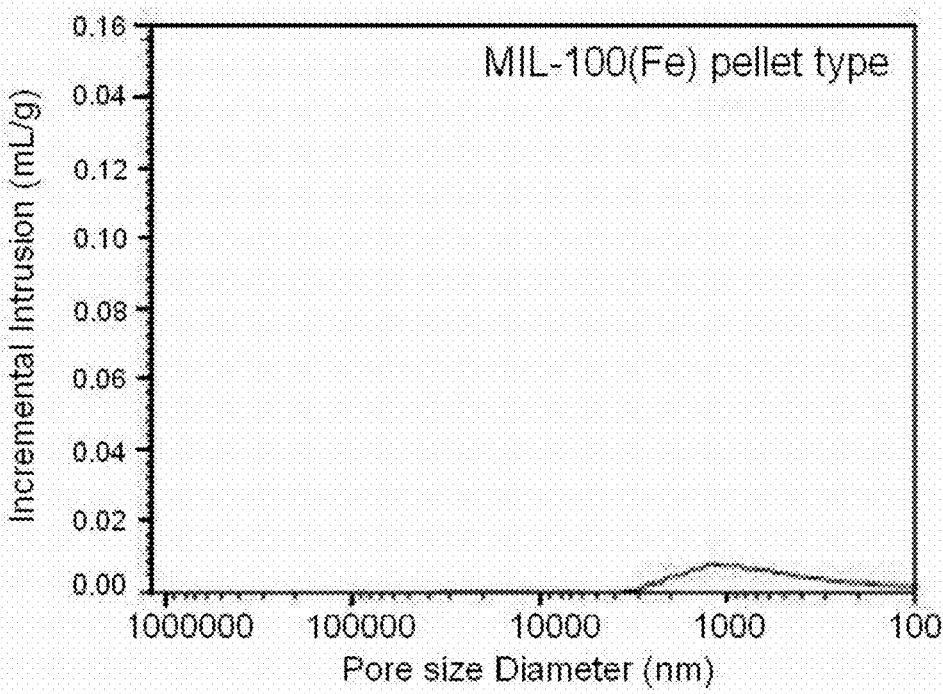
Figure 2:
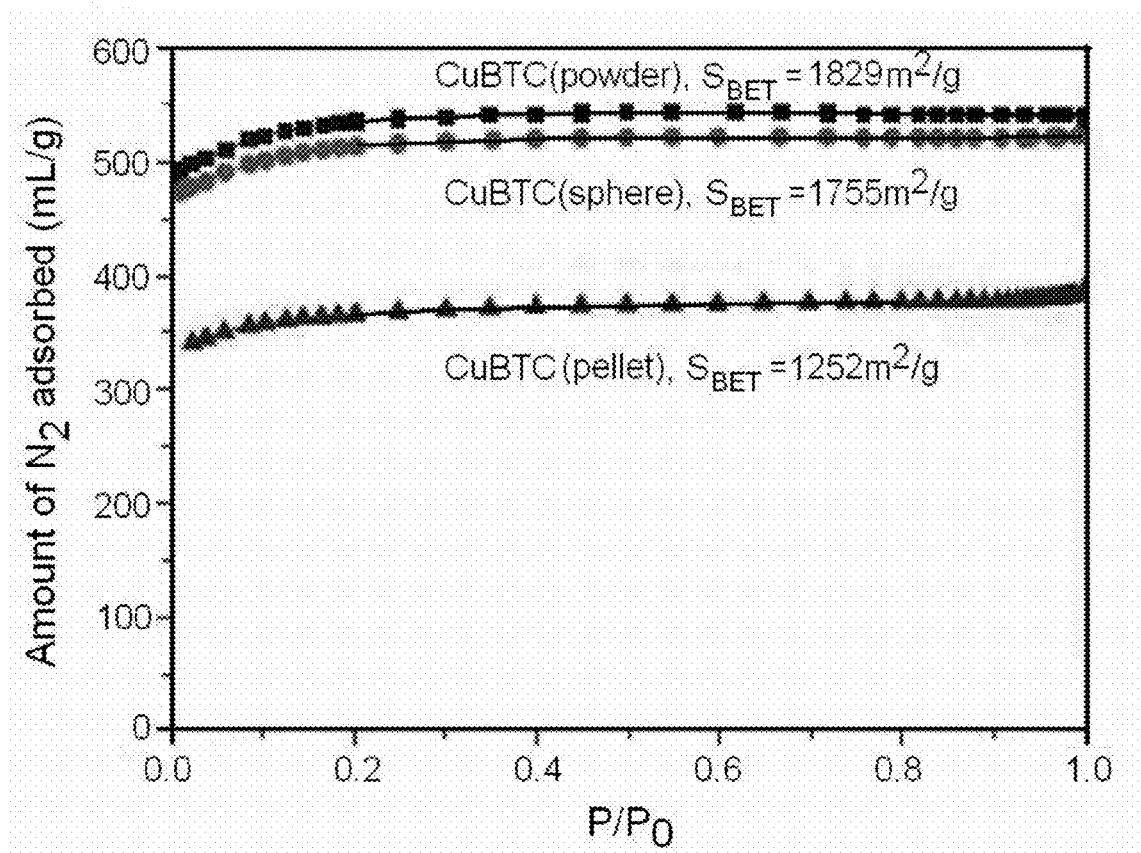
FIG. 2 represents a graph of the nitrogen physical adsorption isotherm at −196° C. of a powder of CuBTC, a spherical composite of CuBTC, and a pellet of CuBTC, respectively.
Figure 3:
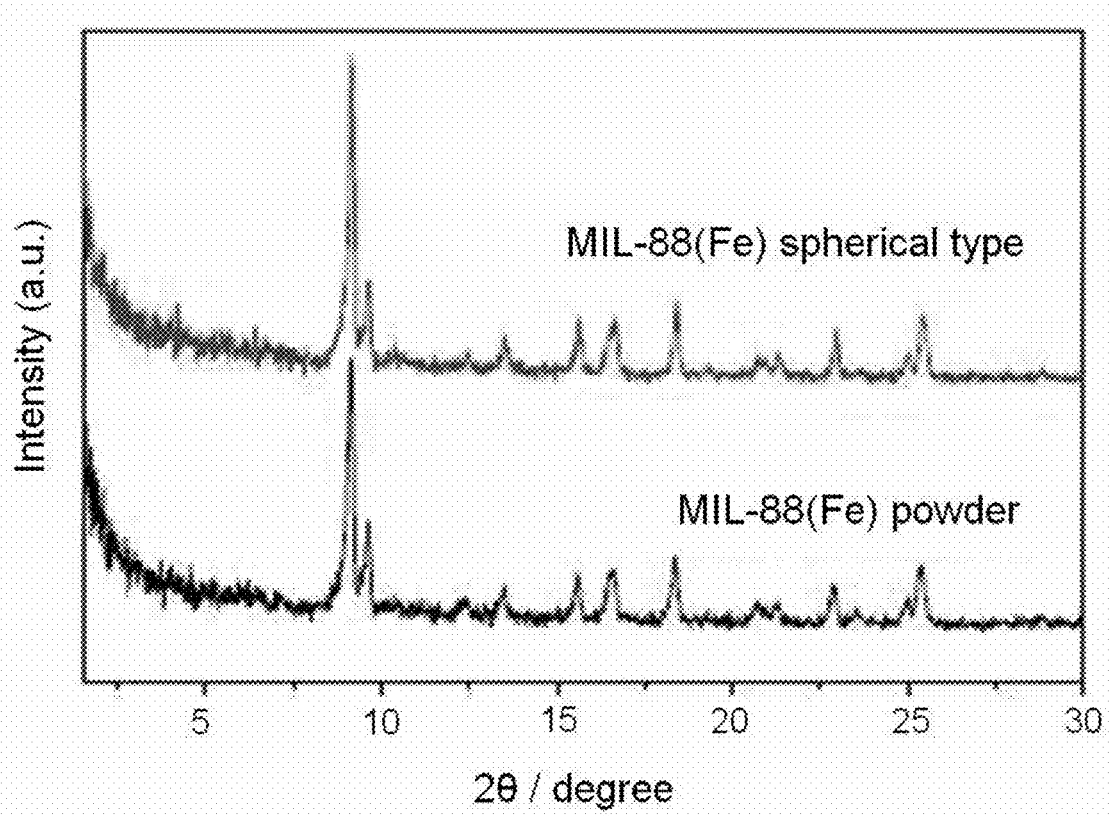
FIG. 3 represents the X-ray diffraction (XRD) analysis of a powder of MIL-88(Fe) and a spherical composite of MIL-88 (Fe).
Figure 4A:
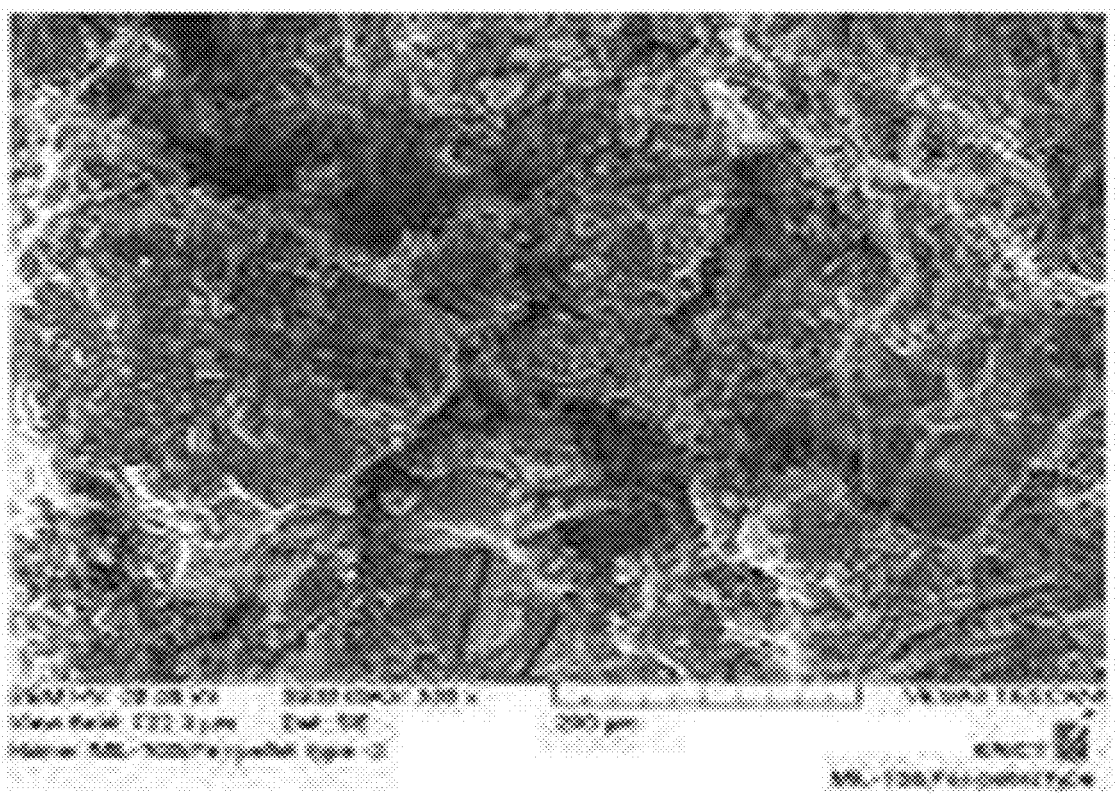
FIG. 4 shows images of a scanning electron microscope (FE-SEM) of the cross-section of (a) a pellet of MIL-100(Fe)_NF, (b) a spherical composite of MIL-100(Fe)_NF and (c) a spherical composite of CuBTC.
Figure 4B:
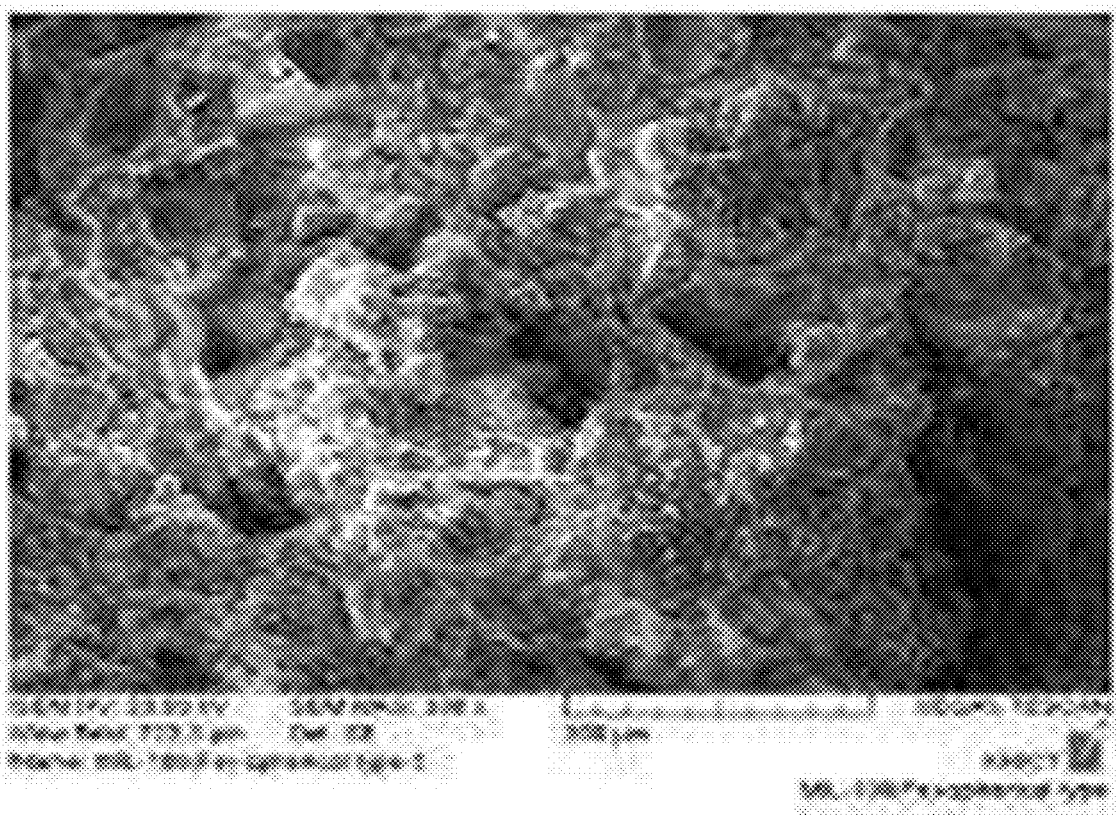
Figure 4C:
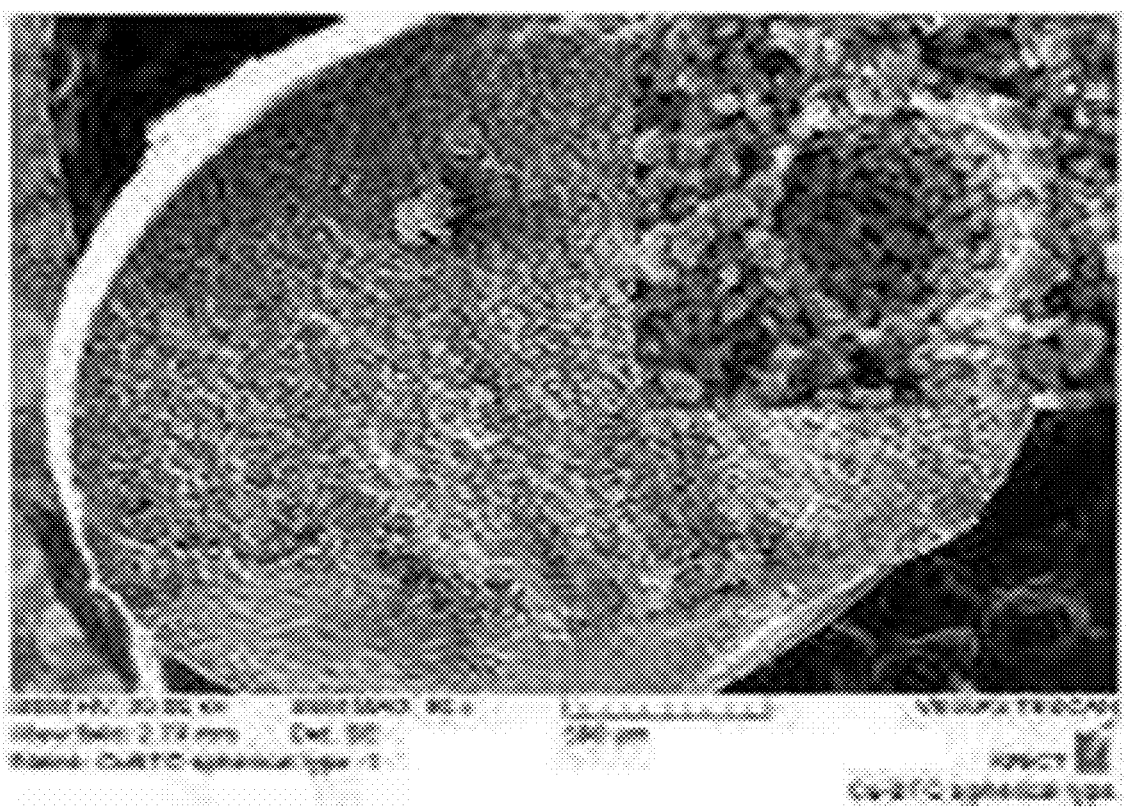
Figure 5:
FIG. 5 shows the photographs of spherical composites of a crystalline hybrid nanoporous material prepared in Examples of the present invention.
Figure 5:
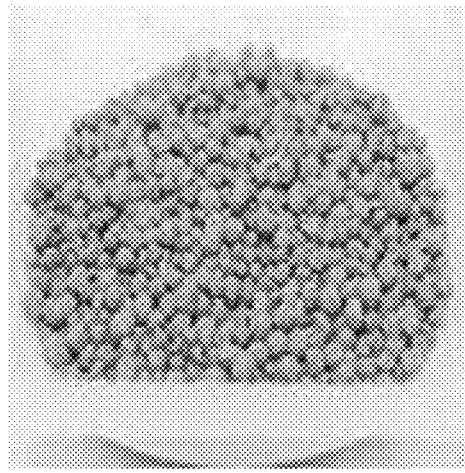
Figure 5:
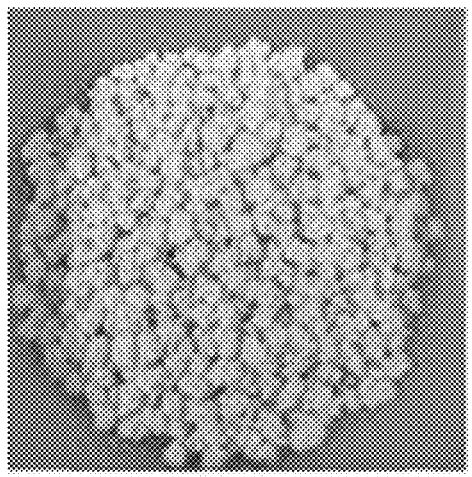
Figure 5:

The first object of the present invention is to provide a composite which comprises at least one crystalline hybrid nanoporous material powder, for example, which can be represented by the formula (I) below, at least one organic polymeric additive and at least one optional inorganic additive; wherein said crystalline hybrid nanoporous material powder can be prepared by coordinating at least one organic ligand and at least one optional anionic ligand to or with a metal ion or a metal ion cluster to which oxygen is bonded. The composite can have a spherical or pseudo-spherical shape and a size of 0.1~100 mm, preferably 0.1 to 30 mm; the total voids volume of the voids is at least 5 volume % based on the sum of the total pore volume of the nanopores having the size of 10 nm or smaller in the composite and the total void volume of the voids having its size of 0.1 μm or larger in the composite; and the specific surface area per weight ($m^2$/g) of the composite is at least 83% based on the specific surface area per weight ($m^2$/g) of the nanoporous material powder.

[Formula 1]

wherein, M represents at least one metal ion selected from a group consisting of Ti, Zr, V, Cr, Fe, Co, Ni, Cu, Zn, Al, Mg, Ca and Li; O represents oxygen; X represents anion ligands containing at least one anion group selected from a group consisting of $OH^-$, $F^-$, $Cl^-$, $Br^-$, $NO_3^-$, $BF_4^-$, $PF_6^-$, $I^-$, $SO_4^{2-}$, $HCO_3^-$ and $R_nCOO^-$ ($R_n$ represents a $C_1$-$C_6$ alkyl group); L represents organic ligands containing at least one organic group selected from a group consisting of carboxylic group (—COOH), an anion of carboxylic acid (—COO$^-$), amine group (—NH$_2$), imino group (>C=NH), nitro group (—NO$_2$), hydroxyl group (—OH), halogen group (—X) and sulfonic acid group (—SO$_3$H); a represents a rational number of 1 to 12; b represents a rational number of 0 to 6; c represents a rational number of 0 to 12; and d represents a rational number of 1 to 12.

Also, the present invention provides a material containing the composite, such as a catalyst, a catalyst carrier, molecular sieves, an absorbent or adsorbent, an adsorbent carrier, a moisture controller for removing vapor or moisture or for drying the water, a heat pump which can utilize, store or transfer heats generated during the adsorption and desorption of gas or liquid, a storage material for gas or liquid, an ion exchange material, a material for chromatography, etc.

In addition, the present invention provides a method of preparing a composite, comprising: a step for coordinating at least one organic ligand and at least one optional anionic ligand with at least one metal ion or at least one metal ion cluster to which oxygen is bonded, to synthesize at least one crystalline hybrid nanoporous material powder; a step for mixing and stirring said synthesized crystalline hybrid nanoporous material powder, at least one organic polymeric additive, at least one optional inorganic additive, and a solvent to obtain a mixture; a step for mechanically pulverizing said mixture to obtain a powder lump having a uniform size; a step for rotating or rotating-translating and shaping said powder lump to a spherical or pseudo-spherical shape; and a step for subjecting said shaped powder lump to a heat treatment at no more than 300° C., a chemical reaction treatment, a microwave or ultrasonic wave treatment to remove the solvent contained in the shaped powder lump.

The term "composite" used in the present invention refers to what contains crystalline hybrid nanoporous material powders and additives, but may partially contain a solvent. In addition, the above composite can additionally contain a void-forming agent, a functional assisting agent, etc.

It is desirable for the composite to have a spherical or pseudo-spherical shape. Here, the "pseudo-spherical" shape includes an oval shape, an egg shape, or a spherical, oval or egg shape with protrusion. When the composite has a spherical or pseudo-spherical shape, it is possible to obtain voids having a size of not less than 0.1 μm and a mechanical strength for real application.

The composites can have a size of 0.1 to 100 mm, preferably 0.1 to 30 mm. Here, the size of the composite can be adjusted depending on the intended application of the composite, for example, such as a catalyst having a specific reaction and a catalyst carrier, an absorbent and/or adsorbent for specific compounds, an agent for controlling moisture, a heat pump, an agent for storing gas and liquid, the ion exchange, the chromatography, the storage and/or absorption of specific materials, etc.

When the composite has the more nanopores having a size of not more than 10 nm, preferably 0.1 nm to 10 nm, the composite has a tendency that the BET surface area is increased. When the composite has the more voids having a size of not less than 0.1 μm, preferably 0.1 μm to 10 μm, the composite has a tendency that the diffusion speed of the materials to be stored and adsorbed is increased. It is preferable for the total void volume to be at least 5 volume % based on the sum of the total pore volume of the nanopores having the size of 10 nm or smaller in the composite and the total void volume of the voids having the size of 0.1 μm or larger in the composite. Such void volume ratios are differently selected depending of the application fields and can play an important role in forming a passage of voids from the outer surface into the inner nanopore of the composite through which guest molecules can smoothly and easily penetrate into the inside of the composite and then enter the inside of the nanopores.

In addition, the specific surface area per weight (m$^2$/g), representatively a BET specific surface area, of the composite is at least 83%, preferably at least 85%, more preferably at least 87%, based on the specific surface area per weight (m$^2$/g) of the nanoporous material powder.

The lower the decrease rate of the specific surface area per weight (m$^2$/g) of the composite based on the specific surface area per weight (m$^2$/g) of the nanoporous material powder is, the larger the effective surface area of the composite is, and thus, in case where the composite is used for a catalyst which helps the activity of a specific reaction, a catalyst carrier, the absorption and/or adsorption of certain compounds, a water dryer, an agent for storing gas and liquid material, ion exchange, chromatography, storage of a substance, preparation of fresh water, etc., the efficiency thereof can be improved.

The specific surface areas of a powder and a composite are obtained by measuring absorption isotherm for gases and then applying the adsorption amount data to adsorption model equations. The value of the surface area of substances such as a crystalline hybrid nanoporous material having a very high surface area can be greatly affected by adsorption models and adsorption equations.

A representative method for measuring the surface area is a method using the adsorption equations of the BET (Brunauer, Emmett and Teller) model, wherein the surface area of a substance is calculated by measuring the amount of nitrogen physical adsorption at a temperature of −196° C. (the boiling temperature of nitrogen) and a pressure within 1 atmosphere. Alternatively, the Langmuir model can be employed to measure the surface area of a substance. In the present invention, the specific surface areas of the powder and the composite are expressed in terms of the BET surface area to maintain a consistency of the surface area value.

The surface area described in the present invention is calculated from the results of the measurement of the surface area through nitrogen physical adsorption at a low temperature of −196° C. by the BET method. The results of the surface area measured by the BET method are generally expressed as the specific surface area per weight, i.e., the unit of m$^2$/g.

It is desirable for the crystalline hybrid nanoporous material powders contained in the composite according to the present invention to be formed by coordinating an organic ligand or an organic ligand and an anionic ligand to or with a metal ion or a metal ion cluster to which oxygen is bonded. Detailed examples thereof are disclosed in detail in the literature [*Chem. Soc. rev.*, 2003, 32, 276].

When analyzing X-ray diffraction pattern of the powder and the composite according to the present, the crystallinity index of a specific diffraction peak of the composite shows at least 70% of the crystallinity index of the powder. The X-ray diffraction of the powder and the composite is obtained under the same condition for the powder and the spherical composite. The smaller difference in crystallinity between a powder and a composite results to the smaller reduction in the surface area and pore volume.

In addition, all the compounds which have been used so far in order to adhere or agglomerate crystalline hybrid nanoporous material powder particles to one another can be employed as an additive in the composite of the present invention. In particular, an organic polymer additive or an organic polymer additive and an inorganic additive are preferable.

The organic polymer additive can include an amorphous thermoplastic resin, a crystalline thermoplastic resin, a thermosetting resin, etc., but not limited thereto. Preferably, it can include at least one thermoplastic selected from a group consisting of polyvinyl butyral (PVB), polyvinyl acetate (PVAc), polyvinyl chloride (PVC), polycarbonate (PC), polyamide (PA), polyacetal, polystyrene (PS) and a cellulose plastic such as acetyl cellulose and nitrocellulose. Thermoplastic resin can be softened and/or melted depending on a heat treatment and can be solidified after cooling, but it is also possible to cure it by cross-linking or to improve the heat resistance thereof.

In addition, the inorganic additives includes, for example, silica, alumina, boehmite, zeolites, mesoporous materials, layered compounds, metal alkoxide, metal halide and sol thereof, etc. and preferably includes silica, alumina, metal alkoxides and metal halide.

The above additive can be used in an amount of 0.1 to 15% by weight, preferably 0.1 to 5% by weight based on the weight of crystalline hybrid nanoporous material powder. If the content of the additives increase, the mechanical strength of a spherical composite can be enhanced. When the contents of the additives are less than 0.1% by weight based on the weight of the crystalline hybrid nanoporous material powder, the mechanical strength is decreased and thus there is a disadvantage in view point of the application. When the contents of the additives are more than 15% by weight, the surface is reduced and thus there is a disadvantage in view point of the maintenance of porosity.

Furthermore, the composite according to the present invention can further comprise a void-forming agent, a functional assisting agent, etc., if necessary, in addition to the crystalline hybrid nanoporous material powder and an additive.

As to the void-forming agent, the present invention preferably employs a different type of void-forming agents which are different from that used in conventional inorganic nanoporous material in order that guest molecules can fast and smoothly access to the nanopores inside a composite.

In order to efficiently secure the void volume, the void-forming agent can be added to the composite of the present invention can include, for example, an organic acid ammonium salt, an inorganic acid ammonium salt or mixture thereof, Specifically, the void-forming agent can includes paraformaldehyde, ammonium acetate, ammonium citrate, ammonium chloride, ammonium hydroxide.

It is preferable to employ a void-forming agent that can be easily decomposed by heat, a chemical reaction, a microwave or ultrasonic wave irradiation, etc. at the temperature of 20 to 150° C. under the normal pressure or in a vacuum, and thus decomposed void-forming agent can play the role to maintain the porous feature and to increase the void volume of the composite. Said void-forming agent can be employed in an amount of 0.1 to 15% by weight, preferably 0.1 to 5% by weight based on the weight of the crystalline hybrid nanoporous material powder.

In addition, the composite of crystalline hybrid nanoporous material powder according to the present invention can further contain a functional assisting agent to providing the composite with a thermal conductivity or an electrical conductivity, which is necessary to be applied to a heat pump or an electronic material, and said agent can include, for example, a non-metallic and metallic carbide, a non-metallic and metallic nitride, a metallic and nonmetallic hydroxide, graphite, graphene oxide, carbon nanotubes, conductive polymers and metal nanoparticles, etc.

Most but not all of the above materials can be removed from the composite, depending on conditions. As a method for removing the materials, mention can be made of heat, a chemical reaction, microwaves or ultrasonic waves, etc. in an inert atmosphere or in a vacuum.

When the above materials are removed by heat and it is not the specific case, it is desirable that the composite is not exposed to a high temperature which exceeds 300° C., so as not to damage a crystalline hybrid nanoporous material.

In addition, the present invention can be directly or indirectly utilized for a material comprising the composite, which can include, for example, a catalyst activating material, a catalyst support, a material for absorption, adsorption, separation or recovery of specific materials such as an effective compound, a toxic compound, a volatile organic compound (VOC), etc., a water controller for removing or drying moisture, a heat pump which can utilize, store or transfer heats generated during the adsorption and desorption of gas or liquid materials, an agent for storing gas or liquid materials, an ion exchanger, a material for chromatography, a material for storing, a material for producing freshwater, etc. The composite of the present application can be used for increasing activity and/or selectivity and/or yield for the purpose of reaction, adsorption, absorption, separation, etc. by charging the composite in a solid-phase column or a reactor in principle and distributing adsorbates or a reactant in a gas or liquid phase at the time of using the composite according to the present invention, and can be used by moving the composite by suspending the composite in a solution.

The present invention provides a method for preparing the above-described composite.

Also, a method according to the present application comprises a step for coordinating an organic ligand and an optional anionic ligand with a metal ion or a metal ion cluster to which oxygen is bonded, to synthesize a crystalline hybrid nanoporous material powder; a step for mixing and stirring said synthesized crystalline hybrid nanoporous material powder, at least one organic polymeric additive, at least one optional inorganic additive, and a solvent to obtain a mixture; a step for mechanically pulverizing said mixture to obtain a powder lump having a uniform size; a step for rotating and shaping said powder lump to a spherical or pseudo-spherical shape; and a step for subjecting said shaped powder lump to a heat treatment at no more than 300° C., a chemical reaction treatment, a microwave or ultrasonic wave treatment to remove the solvent contained in the shaped powder lump.

The term "powder lump" used in the present invention refers to an agglomerated lump having certain shape such as spherical or pseudo-spherical shape, which can be obtained by pulverizing a homogeneous mixture comprising a crystalline hybrid nanoporous material powder, an additives and solvent into powder lump having a uniform size and shape. In addition, the powder lump can further include a void-forming agent, a functional assisting agent, etc. as needed.

The powder lump pulverized can have a size of 0.1 to 100 mm, preferably, 0.1 to 30 mm.

A part of the solvent can evaporate while shaping the prepared powder lump to be spherical or pseudo-spherical shaped by rotating the powder lump.

Further, the addition order of the additional components such as a void-forming agent and a functional assisting agent is not important. In order to control the shape and size of the composite and the uniform distribution of crystalline hybrid nanoporous material powders in the composite and in order to increase the mixing efficiency of the additionally added components, it is possible to employ any or all of the diverse methods which have been already known hitherto in the material processing field. The mixing process can be performed in liquid phase or at solid state.

Thus prepared mixture can be further pulverized through a mechanical grinding process to obtain agglomerated powder lumps having a uniform size, for example, to the level of several micrometers to millimeters, preferably 0.1 to 100 mm, more preferably 0.1 to 30 mm.

When thus prepared powder lump is subjected to a rotation movement or a rotation-translation movement in a cylindrical container, it is possible to shape thus prepared powder lump to be spherical or pseudo-spherical. At this stage, a part of the solvents can evaporate off.

The shaped powder lump can be subjected to a heat treatment at the temperature of not more than 300° C., a chemical reaction treatment, a microwave or ultrasonic wave treatment, in order to remove the solvent contained in the shaped powder lump.

In addition, the void-forming agent and the functional assisting agent that have been additionally added can be removed together with solvent at this step.

In the above method, a step for adjusting the content of the solvent contained in the mixture to control the size of the powder lump can be added if necessary. It was found that there is a tendency that a higher content of the solvent in the mixture results to a larger size of the powder lump, and that a larger size of the powder lump results to a larger size of a composite. In the present invention, therefore, it is possible to prepare composites having the size range of several tens of micrometers to several centimeters depending on the use of the composite by adjusting the content of solvent to be added to the mixture.

It is desirable to employ the solvent in an amount of 1 to 300% by weight based on the weight of the crystalline hybrid nanoporous material powder and the binding agent in an amount of 0.1 to 15% by weight, preferably 0.1 to 5% by weight based on the weight of the crystalline hybrid nanoporous material powder.

In the present application, if the solvent is employed in an amount of about 100% by weight or less based on the weight of the crystalline hybrid nanoporous material powder, a composite having a diameter of about 4 mm or less can be obtained, and if the solvent is employed in an amount of about 100% by weight or more, a composite having a diameter of about 4 mm or more can be obtained. However, the amount of solvent and the size of the composite as above can be varied depending on the type of the crystalline hybrid nanoporous material and the kind of the functional additive, etc.

In addition, in the above preparation method, a step of dividing the shaped powder lump or its particles can be added, if necessary. It is possible to selectively separate and then reuse powder lumps having the non-uniform size or shape. Further, after preparing powder lump particles having uniform sizes and shapes, it is possible to selectively separate and then reuse them.

The preparation conditions such as the agitation temperature, the agitation time, the rotation speed, the rotation time, the drying temperature, the drying time, etc. in the method of preparing the composite according to the present invention are the optimized experimental conditions which have been obtained through repetitive experiments without considering problems according to the upper and lower limit, and therefore, they could be understood as the conditions to be optimized in order to achieve the object of the present invention.

The composite of a crystalline hybrid nanoporous material obtained by the present invention can possess a certain level of structural strength so as to maintain the stability of the framework structure of a crystalline hybrid nanoporous material as well as can possess a high porosity so as to increase the transfer and diffusion velocity of guest molecules; and can maximize the activity of the composite by minimizing a disadvantageous decrease in the specific surface area per weight of the composite, when compared with the specific surface area per weight of the hybrid nanoporous material powder. The composite of a crystalline hybrid nanoporous material prepared by the present invention can be diversely utilized in the fields of a catalyst, a catalyst support, an absorbent, an adsorbent, a material for separation-recovery, a water controller for removing or drying water or water vapor, a heat pump which can store or transfer heats generated during the adsorption and desorption of gas or liquid materials, an agent for storing gas or liquid materials, an ion exchanger, a material for chromatography, a storing material, a material for producing freshwater, etc.

A hybrid nanoporous material powder is known to have a problem that, in the case of existence of water, water molecules attacks on the coordinate bond between a metal ion and an organic ligand to proceed a hydrolysis, which in turn causes a partial breakdown of the crystal structure and deterioration of the crystallinity of the hybrid nanoporous material powder (Reference: John J. Low et al., J. Am. Chem. Soc., 131, 15834-15842 (2009)). However, if a polymeric compound which is more hydrophobic than a hybrid nanoporous material is used as a binder, a hybrid nanoporous material composite obtained in the present invention has a feature that it is possible to improve the hydrothermal stability since the binder can increase the hydrophobicity and entrap the binding sites which are weak to hydrolysis to block them from the attack of the water molecule or polar, acidic or basic compounds.

Since a binder of a polymeric compound can contain at least one kind of functional group, the binder can not only increase the hydrophobicity but also increase hydrophilicity of the surface of the hybrid nanoporous material depending on the kinds of the functional group. It is also possible to improve the hydrophobicity and hydrophilicity at the same time in the composite if a binder of a polymeric compound is used. Thus, the binder of a polymeric compound can provide the function of adjusting the hydrophobicity and hydrophilicity of the surface of hybrid nanoporous material.

It may be possible to shape hybrid nanoporous material powers by using the method of shaping powders by means of mechanical compression such as injection molding, palletizing, tableting, etc. However, if the hybrid nanoporous material having a very high porosity, a problem is frequently observed that, when it is shaped by the shaping method using the mechanical compression, the crystal structure are partially destroyed and the pores are buried to cause a serious decrease in the specific surface area of the hybrid nanoporous material itself.

One of the important characteristics which distinguish the hybrid nanoporous materials from the conventional inorganic nanoporous materials such as zeolite or mesoporous materials having a strong framework structure is that, when guest molecules are adsorbed or desorbed in a liquid or aerial form into or from the nanopores of the hybrid nanoporous material, the hybrid nanoporous materials shows a flexibility in the framework structure that the size of nanopores can increase or decrease by the Host-Guest interaction. Thereby, there are instances where a unit cell volume of a hybrid nanoporous material significantly increases or decreases. In case where such materials are shaped and then charged into a limited space such as column, reactor, etc., therefore, the unit cell volume thereof may severely vary and thus the shaped body can be collapsed or destroyed due to the expansion or reduction of volumes between the shaped bodies. Further, when the shaping is performed by using a too high mechanical pressure, a problem may happen that the framework flexibility which is an important feature of the hybrid nanoporous material may be blocked.

The shaping method of the present invention employs a binder of polymeric compounds but does not use a mechanical compaction method, and thereby, it is possible to maintain the framework flexibility. Therefore, the present invention can secure advantageous performances over other shaping methods. As mentioned above, the shaped body of the present invention has the three characteristics such as the improvement in the hydrothermal stability, the control of surface hydrophilicity/hydrophobicity and the maintenance of the framework flexibility. The three characteristics can distinguish the composite containing the hybrid nanoporous material of the present invention from that of the conventional shaping method. Therefore, the composite containing the hybrid nanoporous material of the present invention can be a novel substance exerting new functions which are different from the hybrid nanoporous material itself.

Since composites comprising a hybrid nanoporous material according to the present invention can maintain the existing features, generate the voids and minimize the reduction of the active surface, and thereby, it is possible to secure the shape stability and to maximize the applicability. In addition, depending on the properties of additives or functional assisting agent, it is possible to induce the increase in the hydrophilicity or hydrophobicity, the change in an adsorption amount of gas or organic compounds, etc.

Hereinafter, the present invention will be described more in detail with reference to Examples, but is not limited thereto.

EXAMPLES

1. Synthesis of Crystalline Hybrid Nanoporous Material Powders

Crystalline hybrid nanoporous material powders which are named CuBTC, MIL-100(Fe)_F, MIL-100(Fe)_NF, MIL-100(Al), MIL-101(V), MIL-101(Cr), MIL-101(Fe), MIL-88 (Fe), MIL-125(Ti) and MIL-125(Ti)_$NH_2$, UiO-66(Zr), UiO-66(Zr)_$NH_2$, respectively were synthesized.

Preparation Example 1

To a Teflon reactor, $Cu(NO_3)_2 \cdot 3H_2O$, 1,3,5-benzenetricarboxylic acid (BTC), and distilled water and ethanol as solvents were introduced so as to give a reactant mixture having a final molar ratio of Cu:BTC:ethanol:$H_2O$=1:0.56:55.6:186. The resulting reactant mixture was pretreated for 5 minutes by the irradiation to an ultrasonic wave at room temperature to make the reactant mixture homogeneous to facilitate the formation of nuclei. The Teflon reactor containing the above pre-treated reactant mixture was mounted on a microwave reactor (Manufactured by CEM, Model Mars-5), which was irradiated to a microwave of 2.45 GHz for two minutes to elevate the temperature to 140° C. The reaction mixture was maintained at the temperature of 140° C. for 30 minutes to carry out the crystallization reaction, and then cooled to room temperature and filtered with a paper filter to obtain powder product. The obtained powder product was purified by washing one time or more with ethanol of 70° C. and then dried at 100° C. to obtain a Cu-based hybrid nanoporous material (named as CuBTC).

It has been confirmed by the analysis of X ray diffraction pattern that the obtained Cu-based hybrid nanoporous material has a cubic structure and the same structure as that of HKUST-1 reported in the literature [*Science*, 1999, 283, 1148, Chui, et al.]. The material obtained in this Preparation Example has the BET surface area of 1829 $m^2/g$ and the pore volume of 0.83 mL/g. The BET surface area of the material obtained in the present invention is about 2.5 times higher than 692 $m^2/g$ of the BET surface area of the material reported in the above literature. The BET surface area and pore volumes of the powder products obtained in this Preparation Example were shown in Table 1.

Preparation 2

To a Teflon reactor, 0.45 g of iron powder (Fe metal), 1.15 g of 1,3,5-benzenetricarboxylic acid (BTC), 2.4 ml of 5M HF and 4.8 ml of $HNO_3$ were introduced to give a reactant mixture having a final molar ratio of Fe:BTC:HF:$HNO_3$:$H_2O$=1:0.67:2:0.6:309. The resulting reactant mixture was stirred at 500 rpm for 30 minutes at room temperature to make the reactant mixture homogeneous. The Teflon reactor containing the above pre-treated reactant mixture was maintained at the temperature of 160° C. for 8 hours to carry out the crystallization reaction and then cooled to room temperature, filtered, purified by washing once or more with distilled water of 80° C. and once with ethanol of 70° C., and dried at 100° C. to obtain a Fe-based hybrid nanoporous material, named as MIL-100(Fe).

It has been confirmed by the analysis of X-ray diffraction pattern that the obtained Fe-based hybrid nanoporous material has the same structure as that of MIL-100 reported in the literature [*Chemical Comm.*, 2007, 2810]. The material obtained in this Preparation Example is named specifically as "MIL-100(Fe)_F" since it contains fluorine in the skeleton. The material obtained in this Preparation Example has the BET surface area of 2150 $m^2/g$ and the nitrogen adsorption amount of 620 mL/g at P/P0=0.5, when determined by the low-temperature physical adsorption analysis of nitrogen at 196° C. The BET surface area and the pore volume of the powder obtained in this Preparation Example were shown in Table 1.

Preparation Example 3

To a Teflon reactor, 16.5 g of $FeCl_3$, 5.6 g of 1,3,5-benzenetricarboxylic acid (BTC) and distilled water were introduced to give a reactant mixture having a final molar ratio of $FeCl_3$:BTC:$H_2O$=1:0.66:54. The resulting reactant mixture was stirred at 500 rpm for 20 minutes at room temperature to make the reactant mixture homogeneous.

The Teflon reactor containing the above pre-treated reactant mixture was maintained at the temperature of 160° C. for 8 hours to carry out the crystallization reaction. The resulting reaction mixture was then cooled to room temperature, filtered, purified by washing once or more with distilled water of 80° C. and once with ethanol of 60° C., and dried at 100° C. to obtain a Fe-based hybrid nanoporous material, named as MIL-100(Fe). In order to obtain high surface area, the product was further purified by contacting with aqueous ammonium fluoride ($NH_4F$) solution (0.1M) at 70° C. for 1 hour or more.

It has been confirmed from the X-ray diffraction spectrum that the material obtained in this Preparation Example has the same structure as that of MIL-100 reported in the literature [*Chemical Comm.*, 2007, 2810]. The material obtained in this Preparation Example has the BET surface area of 1870 $m^2/g$ and the nitrogen adsorption amount of 5500 mL/g at P/P0=0.5, when determined by the low-temperature physical adsorption analysis of nitrogen at 196° C. The BET surface area and the pore volume of the powder obtained in this Preparation Example were shown in Table 1.

Preparation 4

The preparation Example 2 was repeated except for employing the microwave heating manner instead of an electronic heating manner.

The Teflon reactor containing the pre-treated reactant mixture was mounted on a microwave reactor (CEM, Model Mars-5), and then irradiated to a microwave of 2.54 GHz for two minutes to elevate the temperature to 180° C. and maintained at the temperature of 180° C. for 30 minutes to carry out the crystallization reaction. The resulting reaction mixture was cooled to room temperature, separated by the centrifugation, washing with distilled water and drying to obtain powder product. The obtained powder product was purified by washing one time or more with distilled water of 70° C. and once with ethanol of 60° C. and then dried at 100° C. to obtain a Fe-based hybrid nanoporous material. In order to obtain high surface area, the product was further purified by contacting with aqueous ammonium fluoride ($NH_4F$) solution (0.1M) at 70° C. for 1 hour or more.

It has been confirmed from the X-ray diffraction spectrum that the material obtained in this Preparation Example has the diffraction pattern at the same position as that of the material obtained in Preparation Example 2 although their relative intensities of the peaks are different. The BET surface area and the pore volume of the powder obtained in this Preparation Example were shown in Table 1.

Preparation 5

To a Teflon reactor, 0.52 g of chromium powder (Cr metal), 1.41 g of 1,3,5-benzenetricarboxylic acid (BTC), 48 g of water and 4 ml of HF were introduced to give a reactant mixture having a final molar ratio of Cr:BTC:$H_2O$:HF=1: 0.67:289:2. The resulting reactant mixture was stirred at room temperature for 30 minutes and then mounted on a stainless-steel reaction system in an electronic oven having an agitation equipment and maintained at the temperature of 220° C. for 2 days to carry out the crystallization reaction. The resulting reaction mixture was cooled to room temperature, filtered, purified by washing three times or more with distilled water and once with ethanol of 60° C. for two hours, and dried at 100° C. to obtain a Fe-based hybrid nanoporous material, named as MIL-100(Cr).

It has been confirmed by the analysis of X-ray diffraction pattern that the obtained material has the same structure as that of MIL-100(Cr) reported in the literature [*Angew. Chem. Int. Ed.*, 2004, 43, 6296].

Preparation 6

To a Teflon reactor, 1.3 g of aluminum nitrate (Al($NO_3$)$_3$.9$H_2O$), 0.288 g of trimethyl-1,3,5-benzenetricarboxylic acid (Me3BTC) and 5 ml of water were introduced and stirred to give a homogeneous reactant mixture having a final molar ratio of Al:$Me_3$BTC:$H_2O$=1:0.5:80. The resulting reactant mixture was mounted on a stainless-steel reaction system, elevated to the temperature of 200° C., and maintained at the temperature (200° C.) for 3 days to carry out the crystallization reaction. The resulting reaction mixture was then cooled to room temperature, filtered, purified by washing three times or more with distilled water and once with ethanol of 60° C. for 2 hours, and dried at 100° C. to obtain a hybrid nanoporous material, named as MIL-100(Al).

It has been confirmed by the analysis of X-ray diffraction pattern that the obtained material has the same structure as that of MIL-100(Al) reported in the literature [*Chem. Material*, 2009, 21, 5695].

Preparation 7

To a Teflon reactor, 3.18 g of $VCl_3$, 2.57 g of trimethyl-1, 3,5-benzenetricarboxylic acid ($Me_3$BTC) and 25 g of water were introduced to give a reactant mixture having a final molar ratio of V:$Me_3$BTC:$H_2O$=1:0.5:378. The resulting reactant mixture was stirred at room temperature for 30 minutes, and then mounted on a stainless-steel reaction system and maintained at the temperature of 220° C. for 3 days in an electric heating oven to carry out the crystallization reaction. The resulting reaction mixture was then cooled to room temperature, filtered, purified by washing with distilled water and with ethanol of 60° C. for 2 hours, and dried at 100° C. to obtain a V-based hybrid nanoporous material.

It has been confirmed by the analysis of X-ray diffraction pattern that the obtained material has the same structure as that of MIL-100(V) reported in a literature.

Preparation 8

To a Teflon reactor, $CrCl_3$.9$H_2O$, 1,4-benzenedicarboxylic acid and distilled water were introduced to give a reactant mixture having a final molar ratio of Cr:BDC:$H_2O$=1:1:272. The Teflon reactor containing the above reactant mixture was mounted on an electric oven equipped with a stainless-steel reaction system, and maintained at the temperature of 210° C. for 16 hours to carry out the reaction. The resulting reaction mixture was then cooled to room temperature, centrifuged, and washed with distilled water. The resulting product was purified by washing once or more with distilled water of 80° C. and once or more with ethanol of 60° C., and dried at 100° C. to obtain a Cr-based hybrid nanoporous material. In order to obtain high surface area, the product was further purified by contacting with aqueous ammonium fluoride ($NH_4F$) solution (0.1M) for 1 hour or more. As a result, a Cr-based hybrid nanoporous material named as MIL-101(Cr) was obtained.

It has been confirmed from the X-ray diffraction spectrum that the material obtained in this Preparation Example has the same structure as that of MIL-101 reported in the literature [*Science*, 2005, 23, 2040]. The material obtained in this Preparation Example has a very high BET surface area of 4030 $m^2$/g.

Preparation Example 9

To a Teflon reactor, 4.04 g of Fe($NO_3$)$_2$.9$H_2O$, 2.54 g of 1,4-benzenedicarboxylic acid (BDC), 38.8 ml of DMF (Dimethyl formamide) and 0.43 ml of aqueous HCl (37%, 12M)) were introduced to give a reactant mixture having a final molar ratio of Fe:BDC:HCl:DMF=1:1.5:0.66:50. The resulting reactant mixture was stirred for 30 minutes at room temperature.

The Teflon reactor containing the above pre-treated reactant mixture was mounted on a microwave reactor and subjected to the microwave irradiation to elevate the temperature to 150° C. to carry out the crystallization reaction for 1 hour. The resulting reaction mixture was then cooled to room temperature, washed with DMF, purified with ethanol of 60° C., and dried at 100° C. to obtain a hybrid nanoporous material, named as MIL-101(Fe).

It has been confirmed from the X-ray diffraction spectrum that the material obtained in this Preparation Example has nearly the same structure as that of MIL-101 reported in the literature [*Science*, 2005, 23, 2040].

Preparation Example 10

A mixture containing 1.38 g of 1,4-benzenedicarboxylic acid (BDC), 20 ml of DMF and 5 ml of methanol (MeOH) was stirred for 30 minutes, elevated to 100° C. and then stirred for further 30 minutes. To the above stirred mixture, 1.5 ml of $Ti[OCH(CH_3)_2]_4$ was added and refluxed for 72 hours at 100° C. to carry out the crystallization reaction for 1 hour. After the completion of the above reaction, the resulting reaction mixture was cooled to room temperature, filtered and washed with DMF and methanol to obtain a yellow product. In order to eliminate impurities contained in the above product, a two-step purification was carried out as follows: First, 1 g of the product was added to 100 ml of DMF and stirred for 12 hours, and the solid product was filtered. Next, the above-purified product was introduced into methanol of 60° C., stirred for 12 hours and then filtered to obtain the final product in which impurities have been eliminated. The BET surface area and the pore volume of the powder obtained in this Preparation Example were shown in Table 1.

Preparation Example 11

In a 10L-Teflon reactor, a mixture containing a solution of 3L of DMF and 764 ml of methanol (MeOH) and 209 g of 2-amino-1,4-benzenedicarboxylic acid ($NH_2$-BDC) was stirred for 1 hour at room temperature, elevated to 100° C. and further stirred for 1 hour. To the above stirred mixture, 230 ml of $Ti[OCH(CH_3)_2]_4$ was added to give a reactant mixture having a final molar ratio of Ti:$NH_2$-BDC:MeOH:DMF=1:1.5:24:50. The resulting reactant mixture was mounted on a stainless-steel reaction system in an electric oven having an agitation equipment and stirred at the temperature of 100° C. for 24 hours to carry out the crystallization reaction. After completion of the reaction, the resulting reaction mixture was cooled to room temperature, filtered and washed with DMF and methanol to obtain a yellow product. In order to eliminate impurities contained in the above product, a two-step purification was carried out as follows: First, the product was added to DMF and stirred at room temperature for 12 hours and filtered. Next, the product purified with DMF was introduced into methanol of 60° C., stirred for 12 hours and then filtered to obtain the final product in which impurities have been eliminated. The BET surface area and the pore volume of the powder obtained in this Preparation Example were shown in Table 1.

Preparation Example 12

In a Teflon reactor, 25.2 g of $FeCl_3.9H_2O$ was added to a solution of 23.31 g of DMF and 9.38 g of 5M HCl and then stirred until the ferric chloride was completely dissolved. To the resulting mixture, 15.5 g of 1,4-benzenedicarboxylic acid (BDC) was added and stirred for 5 minutes to give a reactant mixture having a final molar ratio of Fe:BDC:HCl:DMF=1:1:0.4:3.4. The resulting reactant mixture was maintained at the temperature of 150° C. for 12 hours to carry out the crystallization reaction. After completion of the reaction, the resulting reaction mixture was cooled to room temperature and filtered to obtain a crystal. Thus obtained crystal was introduced into DMF, stirred at 70° C. for 12 hours, and filtered to eliminate the unreacted crystalline BDC. The resulting solid product was introduced into 300 ml of ethanol, stirred at 65° C. for 12 hours to eliminate DMF to obtain the final product.

Preparation Example 13

To a Teflon reactor, $ZrCl_4$, 1,4-benzenedicarboxylic acid (BDC) and DMF as a solvent were introduced to give a reactant mixture having a final molar ratio of Zr:BDC:DMF=1:1:1423. The Teflon reactor containing the reactant mixture was introduced in an electric oven and maintained at the temperature of 120° C. for 48 hours to carry out the crystallization reaction. After completion of the reaction, the resulting reaction mixture was slowly cooled to room temperature, filtered, washed with DMF and dried. It has been confirmed from the X-ray diffraction spectrum that the material obtained in this Preparation Example has the same structure as that of UiO-66 reported in the literature [*J. Am. Chem. Soc.*, 2008, 130, 13850]. The BET surface area and the pore volume of the powder obtained in this Preparation Example were shown in Table 1.

Preparation Example 14

To a Teflon reactor, $ZrCl_4$, 2-amino-1,4-benzenedicarboxylic acid ($NH_2$-BDC) and DMF as a solvent were introduced to give a reactant mixture having a final molar ratio of Zr:$NH_2$-BDC:DMF=1:1:1423. The Teflon reactor containing the reactant mixture was introduced in an electric oven and maintained at the temperature of 120° C. for 48 hours to carry out the crystallization reaction. After completion of the reaction, the resulting reaction mixture was slowly cooled to room temperature, filtered, washed with DMF and dried. It has been confirmed from the X-ray diffraction spectrum that the material obtained in this Preparation Example has the same structure as that of UiO-66 reported in the literature [*J. Am. Chem. Soc.*, 2008, 130, 13850]. The BET surface area and the pore volume of the powder obtained in this Preparation Example were shown in Table 1.

TABLE

| Preparation of Example | Type of materials | synthesis method | BET surface area ($m^2/g$) | Pore volume (mL/g) |
|---|---|---|---|---|
| 1 | CuBTC | microwaves | 1829 | 0.83 |
| 2 | MIL-100(Fe)_F | hydro thermal | 2150 | 1.01 |
| 3 | MIL-100(Fe)_NF | hydro thermal | 1870 | 1.06 |
| 4 | MIL-100(Fe)_MW | microwaves | 2200 | 1.11 |
| 5 | MIL-100(Cr) | hydro thermal | 2030 | 0.99 |
| 6 | MIL-100(Al) | hydro thermal | 2175 | 0.95 |
| 7 | MIL-100(V) | hydro thermal | 2025 | 1.01 |
| 8 | MIL-101(Cr) | hydro thermal | 4030 | 1.90 |
| 9 | MIL-101(Fe) | microwaves | 2534 | 1.34 |
| 10 | MIL-125(Ti) | reflux | 1633 | 0.84 |
| 11 | MIL-125(Ti)_$NH_2$ | hydro thermal | 1426 | 0.59 |
| 12 | MIL-88(Fe) | hydro thermal | — | — |
| 13 | UiO-66(Zr) | reflux | 1388 | 0.83 |
| 14 | UiO-66(Zr)_$NH_2$ | reflux | 1053 | 1.03 |

2. Preparation of Composites Comprising Crystalline Hybrid Nanoporous Material Powders By using crystalline hybrid nanoporous material powders obtained in Preparation Examples 1 to 14, it was possible to prepare spherical or pseudo-spherical composites having a diameter of 0.5 to 5 mm.

Example 1

To 30 g of hybrid nanoporous material powder MIL-100 (Fe)_NF obtained in Preparation Example 2, polyvinyl butyral (PVB) in an amount of 3% by weight based on the weight of hybrid nanoporous material and ethanol in an amount of 90% by weight based on the weight of hybrid nanoporous material are added and stirred to give a mixture.

By using a mechanical mastication process, the mixture containing Fe-based hybrid nanoporous material was converted to powder lump in the form of grains having a homogeneous size distribution. It is possible to separate and recycle non-uniform grains that do not belong to a predetermined size range.

The prepared powder lump grains are introduced into a cylinder and rotated at 120 to 150 rpm for about 6 hours to shape the powder lump grains in a spherical shape having a diameter of 2 to 4 mm. At this stage, it is also possible to separate and recycle powder lump grains having non-uniform size or shape.

The grains of powder lump which have been shaped into a spherical shape at the above step are dried in a vacuum drying oven under condition at 120° C. for 10 hours to give the spherical composite of this Example 1. It has been confirmed that the spherical composite having the mean diameter of 2.3 mm has a high BET surface area that reaches to 99.97% of the BET surface area of the hybrid nanoporous material itself in the form of powder.

When the inner volume of the spherical composite having the mean diameter of 2.3 mm is determined by using a Mercury Porosimeter (Micromeritics company; Autopore IV9500), the pore volume of the nanopores having the size of smaller than 10 nm and the void volume of the voids having the size of larger than 0.1 μm are determined as 1.019 mL/g and 0.474 mL/g, respectively, and the void volume of the voids having the size of larger than 0.1 μm reaches to about 32% of the total volume.

Examples 2 to 6

Except that powders of CuBTC (Example 2), MIL-88(Fe)_NH$_2$ (Example 3), MIL-125(Ti)_NH$_2$ (Example 4), UiO-66(Zr) (Example 5) and UiO-66(Zr)_NH$_2$ (Example 6) are employed instead of MIL-100(Fe)_NF powder used in Example 1, each spherical composite is accomplished in the same manner as in Example 1. The composites obtained in the Examples 2 to 6 are measured in the terms of the diameter and BET surface area of the composites, and the decreasing rate of the surface area of the composite compared to that of the powder. The obtained composites have the range of 1-5.5 mm in diameters and the range of 0-11% in decreasing rates of the surface area of the composites compared to that of the powders. When using a hardness grading apparatus based on Zwick, the obtained composites have the mechanical compacting strength of 4.40N for UiO-66(Zr) composite having a mean diameter of 2.3 mm and 3.78N for CuBTC composite having a mean diameter of 2.7 mm.

Example 7

To 20 g of hybrid nanoporous material powder of MIL-100 (Fe)_NF obtained in Preparation Example 3, paraformaldehyde as a void-forming agent in an amount of 1% by weight based on the weight of the powder, polyvinyl butyral (PVB) in an amount of 3% by weight based on the weight of the powder and ethanol in an amount of 90% by weight based on the weight of hybrid nanoporous material are added and stirred to give a mixture. Then, by using the same manner as Example 1, the composite is prepared in a spherical shape having the mean diameter of about 2.5 mm. The composite is treated at 120° C. for 10 hours under vacuum in a vacuum drying oven to remove the void-forming agent and solvents.

When the inner volume of the spherical composite having the mean diameter of 2.3 mm is determined by using a Mercury Porosimeter (Micromeritics company; Autopore IV9500), the pore volume of nanopores having the size of smaller than 10 nm is similar that of the composite of Example 1 and the void volume of the voids having the size of larger than 0.1 μm is determined as 0.551 mL/g, which shows an improvement by about 16% compared with composite without using a void-forming agent was not used.

Example 8

Except that paraformaldehyde used in Example is replaced with aqueous 35% ammonium hydroxide solution in an amount of 3% by weight based on the weight of the powder of MIL-100(Fe)_NF material, a spherical composite having a mean diameter of about 2.5 mm is prepared according to the same manner of Example 7. The composite is treated at 120° C. for 10 hours under vacuum in a vacuum drying oven to remove the void-forming agent and solvents.

When the inner volume of the spherical composite is determined by using a Mercury Porosimeter (Micromeritics company; Autopore IV9500), the pore volume of nanopores having the nanopore size of smaller than 10 nm is similar that of the composite of Example 1 and the void volume of the voids having the pore size of larger than 0.1 μm is improved by about 11% compared with composite without using a pore-forming agent was not used.

Example 9

To 25 g of hybrid nanoporous material powder of MIL-100 (Fe)_NF obtained in Preparation Example 3, silicon carbide (SiC) as a pore-forming agent in an amount of 5% by weight based on the weight of the powder, polyvinyl butyral (PVB) in an amount of 3% by weight based on the weight of the powder and ethanol in an amount of 90% by weight based on the weight of hybrid nanoporous material are added and stirred to give a mixture. Then, by using the same manner as Example 1, the composite is prepared in a spherical shape having the mean diameter of about 2.5 mm.

Example 10

To 25 g of hybrid nanoporous material powder of MIL-100 (Fe)_NF obtained in Preparation Example 3, sodium polyacrylate as a pore-forming agent in an amount of 5% by weight based on the weight of the powder, polyvinyl butyral (PVB) in an amount of 3% by weight based on the weight of the powder and ethanol in an amount of 90% by weight based on the weight of hybrid nanoporous material are added and stirred to give a mixture. Then, by using the same manner as Example 1, the composite is prepared in a spherical shape having the mean diameter of about 2.5 mm.

Example 11

Except that the solvent ethanol used in Example 1 is employed in an amount of 150% by weight based on the weight of the powder of the hybrid nanopore, the spherical composite containing MIL-100(Fe)_NF is prepared according to the same manner of Example 1. The obtained composite has a mean diameter of about 8 mm and a decreasing rate of about 7% of the surface area of the composite compared with the powder.

Example 12

The organic polymer additive of polyvinyl butyral used in Example 1 is substituted with polyvinyl acetate (PVAc). Polyvinyl acetate in an amount of 5% by weight based on the weight of the powder is dissolved in ethanol in an amount of 90% by weight based on the weight of hybrid nanoporous material to give an ethanol solution, to which the hybrid nanoporous material powder and sodium polyacrylate in an amount of 5% by weight based on the weight of the powder are added and stirred to give a mixture. Then, by using the same manner as Example 1, the composite is prepared in a spherical shape having the mean diameter of about 2.5 mm.

Evaluation of Examples

The value ($m^2/g$) of the BET surface area per weight of the crystalline hybrid nanoporous material powder used for preparing a composite and the value ($m^2/g$) of the BET surface area ($m^2/g$) per weight of the composites prepared in the above Examples were measured respectively and described in Table 2. The decreasing rate of the surface area of the composite compared with the powder was calculated based on the below math formula 1.

The decreasing rate of the BET surface area per weight (%)=(the BET surface area per weight of the powder−the BET surface area per weight of the composite)×100/(the BET surface area per weight of the powder)  [math formula 1]

TABLE 2

| Example | Type of crystalline hybrid nanoporous material | Diameter of the composite (mm) | A | B | C |
|---|---|---|---|---|---|
| Example 1 | MIL-100(Fe)_NF | 2.3 | 1870 | 1865 | 0.03 |
| Example 2 | CuBTC | 2.7 | 1829 | 1755 | 4.0 |
| Example 4 | MIL-125(Ti)_NH$_2$ | 2.4 | 1426 | 1407 | 1.3 |
| Example 5 | UiO-66(Zr) | 2.3 | 1050 | 946 | 9.9 |
| Example 6 | UiO-66(Zr)_NH$_2$ | 2.6 | 1150 | 1027 | 10.7 |

A: the BET surface area ($m^2/g$) per weight of the powder,
B: the BET surface area ($m^2/g$) per weight of the composite,
C: the decreasing rate (%) of the BET surface area per weight.

It can be understood from the Table 2 that the composites of the Examples which have been prepared in a spherical shape by means of the rotation in a cylinder as described in the present invention have a range of 0-11% of the decreasing rate of the BET surface area value ($m^2/g$) per weight of is in the range of.

Comparison Example 1

To the powder of the Fe-based crystalline hybrid nanoporous material MIL-101(Fe)_NF prepared in Preparation Example 3, a finely grinded graphite powder as a solid lubricant is added in an amount of 3% by weight and mixed in solid state. The resulting solid mixture is introduced into a rotary tablet press and pressed under a pressure of 50 N by using a pellet die having 3 mm-diameter holes and a punch to prepare a cylindrical pellet having a diameter of 3 mm and a length of 4 mm. Thus prepared pellet has a surface area of 1270 $m^2/g$, which means that the surface area is decreased by 30.5% compared with the powder.

The above result means a large decrease in the surface area when compared with the decreasing rate of 0.03% in Example 1, which is the decreasing rate of the surface area of the spherical composite containing MIL-101(Fe)_NF powder prepared in Example 1 compared with that of the powder. In addition, the X ray diffraction analysis shows that the crystallinity of the composite containing MIL-101(Fe)_NF powder is decreased by 41% when comparing with that of powder. Such result means that the decrease in the crystallinity of pellet compared with powder in the Comparative Example 1 is much more than the decreasing rate of 8% in the crystallinity of the spherical composite of the present invention.

Comparison Example 2

To the powder of CuBTC of the Cu-based crystalline hybrid nanoporous material prepared in Preparation Example 1, a finely grinded graphite powder as a solid lubricant is added in an amount of 3% by weight and mixed in solid state. The resulting solid mixture is introduced into a rotary tablet press and pressed under a pressure of 50 N by using a pellet die having 3 mm-diameter holes and a punch to prepare a cylindrical pellet having a diameter of 3 mm and a length of 4 mm. Thus prepared pellet has a surface area of 1250 $m^2/g$, which means that the surface area is decreased by 30.5% compared with the powder.

3. Application Embodiment

Example 13

The results on adsorption of methane, carbon dioxide and hydrogen can be utilized in the processes of the purification and storage of hydrogen and other gases which are derived from the refining processes of refining natural gas, the reforming process of natural gas and the water gas shift process.

The present Example illustrates the result on the high-pressure adsorption of methane, carbon dioxide and hydrogen onto a spherical composite of MIL-100(Fe)_F having a diameter of 1.3-1.5 mm that was obtained in the above Examples. The high-pressure gas adsorption experiment is carried out in a volume-type high-pressure adsorption device (manufactured by VTI Corporation, HPVA-100) equipped with a rotary vacuum pump and a turbo molecular pump.

Before conducting an adsorption experiment, a cell for high-pressure adsorption containing 1 gram of the spherical composite is mounted on an another vacuum device and pre-treated under a high vacuum of $1 \times 10^{-5}$ Torr at 150° C. for 12 hours. After the weight of the pre-treated sample is precisely measured, the high-pressure adsorption cell is mounted on the high-pressure adsorption device to measure an adsorption isotherm. During the measurement, the adsorption temperature of the cell containing the composite sample is maintained accurately at 30° C. using a constant temperature circulating apparatus.

The result thus obtained shows the methane adsorption amount of 6.3 mmol/g (141 mL/g), the carbon dioxide adsorption amount of 21.7 mmol/g (486 mL/g) and the hydrogen adsorption amount of 8.5 mL/g at the temperature of 30° C. under the pressure of 50 atm, which are high adsorption values close to about 96% based on the adsorption amount of MIL-100(Fe)_NF powder. Also, the test results shows that the adsorption amount of the methane and carbon dioxide in the spherical composite is improved by 30% or more when compared with the adsorption amount of the same gas in the pellet containing MIL-100(Fe)_NF and having a diameter of 3 mm of prepared in Comparative Example 1.

Example 14

The present Example illustrates the experiments of adsorbing ethanol, toluene and propylene carried out in room temperature under the atmospheric pressure to evaluate the adsorption performance of a spherical composite comprising the hybrid nanoporous material on polar and non polar volatile organic compounds and olefin gas.

The measurement of the adsorption amount of organic compounds and gases onto the spherical composite of MIL-100(Fe)_NF having a diameter of 0.9-1.1 mm is carried out in a thermogravimetric analyzer (manufactured by HIDEN, Intelligent Gravimetric Analyzer IGA) in which a rotary vacuum pump and a turbo pump were equipped.

Before conducting an adsorption experiment, the spherical composite is pre-treated under vacuum at 150° C. for 12 hours. And the ethanol and toluene employed in the test are purified by introducing them into an adsorption glass cell and subjecting them to the cooling-reducing pressure-defreezing ten times to eliminate impurities such as water, carbon dioxide, etc. During the measurement, the adsorption temperature of the cell containing the composite sample is maintained accurately at 30° C. using a constant temperature circulation apparatus.

The result thus obtained shows that the equilibrium adsorption amount of toluene and ethanol onto the spherical composite are 12.8 mmol/g and 6.18 mmol/g, respectively, at the absorption temperature of 30° C. and $P/P_0 > 0.9$ corresponding to the saturated vapor pressure of 90% or more, and the adsorption amount of propylene is at 4.91 mmol/g at the temperature of 30° C. under the pressure of 1 atm, which are high adsorption values close to about 95% based on the adsorption amount of MIL-100(Fe)_NF powder.

Example 15

In the present Example, a spherical composite of MIL-101 (Cr) having a diameter of 0.9-1.1 mm was prepared as the same manner in Example 1 and then the adsorption isotherms of hydrogen, carbon monoxide, carbon dioxide and C2 hydrocarbon at room temperature and 1 atmosphere were measured and compared.

The measurement of the adsorption amount of each gas is carried out in a thermogravimetric analyzer (manufactured by HIDEN, Intelligent Gravimetric Analyzer IGA) in which a rotary vacuum pump and a turbo pump were equipped.

Before conducting an adsorption experiment, the spherical composite is pre-treated under vacuum at 150° C. for 12 hours. During the measurement of the adsorption amount, the adsorption temperature of the cell containing the composite sample is maintained at 30° C. using a constant temperature circulation apparatus.

The result thus obtained shows the hydrogen adsorption amount of 0.9 mL/g, the carbon oxide adsorption amount of 41.5 mL/g and the carbon dioxide adsorption amount of 95.1 mL/g at the temperature of 30° C. under the pressure of 760 torr. The result also shows that the acetylene adsorption amount at the normal pressure of 760 torr is 235 mL/g at 0° C., 163 mL/g at 25° C. and 132 mL/g at 40° C., respectively. The result shows that the adsorption amounts at 40° C. under 760 torr of three C2 hydrocarbons such as ethane, ethylene and acetylene give are 42 mL/g for ethane, 78 mL/g for ethylene, and 132 mL/g for acetylene. The above adsorption results for C2 hydrocarbons can be applied to the adsorptive separation process of C2 hydrocarbons in the future.

Example 16

The present Example, an experiment was carried out to simulate an application where the moisture present in the air is adsorbed at room temperature and then the moisture is to be reproduced at a low temperature of not more than 100° C.

To the device used in this Example, a stainless steel adsorption column with a diameter of 12.6 mm and a length of 100 mm is mounted, and a gas flow controller was attached in front of the stainless steel adsorption column in order to adjust the amount of flow of the reactant gas. A precision hygrometer was employed for the measurement of the composition change of water before and after the reaction, and the generated water was collected through a condenser. A column for adsorption employed in the moisture recovering experiment is filled with 10 grams of a spherical composite of MIL-100 (Fe)_NF having a diameter of 2.3 mm.

Before the adsorption experiment, the spherical composite was pre-treated at 70° C. and the relative humidity of 20% for 12 hours. After the pre-treatment, an adsorption is carried out for 12 hours by flowing wet air having a relative humidity of 65% at 15° C. at the rate of 700 mL/min, then a desorption is carried out by flowing dry air having a relative humidity of 15% at 70° C. at the rate of 100 mL/min. The moisture desorbed from the adsorbents is collected. The test results show that, in case of using a spherical composite, the amount of the recovered moisture is 810 g based on 1 kg of the adsorbent, which is the improvement of about 39% compared with 581 g/kg of the moisture amount recovered by a pellet having a diameter of 3 mm and a size of 4 mm.

Example 17

This Example illustrates an application on the recovery of moisture present in the air by using a spherical composite of MIL-100(Fe)_NF containing 5% by weight of sodium polyacrylate prepared in Example 10.

In the same column as employed in the moisture recovery experiment of Example 15, 12 g of the spherical composite of MIL-100(Fe)_NF having a diameter of 2.5 mm was charged. By using the same device, procedure and conditions as used in Example 11, the moisture desorbed from the adsorbent was collected. The amount of the recovered moisture was 835 g based on 1 kg of the adsorbent.

Example 18

A spherical composite containing MIL-101(Cr) and having a diameter of 0.9-1.1 mm and a spherical composite containing MIL-100(Fe)_NF and having a diameter of 0.9-1.1 mm are measured on the moisture absorption-desorption features.

The measurement on the moisture adsorption and desorption by the spherical composite is performed by using a thermogravimetric analyzer (manufactured by HIDEN, Intelligent Gravimetric Analyzer IGA) equipped with a rotary vacuum pump and a turbo pump.

Before conducting an adsorption experiment, the spherical composite is pre-treated at 150° C. for 12 hours under a high vacuum of $1 \times 10^{-5}$ torr. After the pre-treatment, the temperature of the adsorption and desorption of the composite sample is maintained at a temperature of 30° C. to 90° C. using a constant temperature circulation apparatus.

When exposed to the condition of P/P0=0.6 corresponding to the saturation vapor pressure of 60% at the adsorption temperature of 30° C., the moisture adsorption amount of the spherical composite of MIL-101(Cr) is 1.41 g per 1 g of the dried spherical composite, and the moisture adsorption amount of the spherical composite of MIL-100(Fe)_F is 0.82 g per 1 g of the dried spherical composite, which are high values.

The above spherical composite containing the adsorbed moisture is subjected to the desorption at 90° C. under vacuum for one hour and then to a re-adsorption at the same condition as above. The moisture adsorption amount is 1.25 g per 1 g of the dried spherical composite of MIL-101(Cr), and 0.71 g per 1 g of the dried spherical composite of MIL-100 (Fe)_F.

The experiments of the adsorption at 30° C. and the 70° C. desorption were repeated ten times, during which the moisture adsorption amounts at 30° C. were measured. The moisture adsorption amounts at 30° C. were stable and nearly constant within the experimental error of 2% or less without decrease of moisture adsorption amount.

Example 19

A spherical composite containing MIL-125(Ti)_NH2 and having a diameter of 0.9-1.1 mm is measured on the feature of absorbing-desorbing moisture.

The measurement of the moisture adsorption and desorption by the spherical composite was carried out in a device which is the same as used in Example 9.

Before conducting an adsorption experiment, the spherical composite is pre-treated at 150° C. for 12 hours under a high vacuum of $1 \times 10^{-5}$ Torr. After the pre-treatment, the temperature of the adsorption and desorption of the composite sample is maintained at 30° C. to 60° C. using a constant temperature circulation apparatus.

The difference (Water Loading Spread) of the moisture adsorption-desorption amount between an adsorption at the adsorption temperature of 30° C., moisture saturation vapor pressure of 1.2 kPa for one hour and a desorption at the adsorption temperature of 140° C., moisture saturation vapor pressure of 5.6 kPa for one hour has a very high value of 395 g per 1 kg of the spherical composite. The value is more than 3 times as high as 120 g per 1 kg, which is the difference (water loading spread) in the moisture adsorption/desorption amount under the same condition by using a NaX zeolite powder (manufactured by Zeolyst company; $SiO_2$/$Al_2O_3$=2.81, BET surface area of about 605 m²/g), which is now applied to a heat pump by utilizing the feature of adsorbing and desorbing moisture. Therefore, the spherical composite of the present invention can be expected to be applied for a heat pump.

Example 20

A spherical composite containing MIL-101(Cr) and having a diameter of 0.9-1.1 mm was subjected to an adsorption and a desorption of moisture under similar conditions in order to apply it to a heat pump which utilizes and transfers the vaporization heat and condensation heat generated during the moisture adsorption/desorption process.

The measurement on the moisture adsorption and desorption by the spherical composite is performed by using a thermogravimetric analyzer (HIDEN; Intelligent Gravimetric Analyzer IGA) equipped with a rotary vacuum pump and a turbo pump.

Before conducting an adsorption experiment, the spherical composite is pre-treated at 150° C. for 12 hours under vacuum. The water employed in the test is purified by being introduced into a glass cell attached to the device and then subjected to a cooling-reducing pressure-defreezing ten times to eliminate impurities such as carbon dioxide, etc. During the measurement, the adsorption temperature of the cell containing the composite sample is maintained at 30° C. for adsorption and at 140° C. for desorption using a constant temperature circulation apparatus.

The spherical composite desorbed at 150° C. was subjected to an adsorption at 30° C. under a relative humidity of 70% for 5 hours, to a desorption at 140° C. under a moisture pressure of 5.6 kPa for 2 hours, and again to an adsorption at 30° C. under a moisture pressure of 1.2 kPa for 5 hours, by which the difference between the moisture amount adsorbed at 30° C. and the moisture amount desorbed at 140° C. was measured. The moisture amount (Water Loading Spread) was 161 g per 1 kg of the spherical composite. Even after repeating the above process more than 10 times, the moisture amount was measured within the range of experimental error of 2% or less.

Example 21

A spherical composite containing MIL-101(Fe)_F was subjected to an adsorption experiment in order to remove the moisture contained in trace in p-xylene of an organic solvent.

The experiment of removing moisture was performed by introducing 100 mL of para-xylene containing moisture in a concentration of 125 ppm into a 250 ml round flask, adding 3 g of the spherical composite having a size of 0.9-1.1 mm dried at 150° C. for 12 hours in a vacuum oven, and then stirring with a magnetic stirrer, by which the amount of removed moisture was determined by measuring the decrease of moisture concentration according to time by using Karl-Fischer titrator.

The result showed that the concentration of moisture was decreased from 125 ppm to 8 ppm after 24 hours. It has been confirmed from the experimental result that a spherical composite containing a crystalline hybrid nanoporous material, especially where said nanoporous material has coordinately unsaturated sites in the framework thereof, is effective in removing the moisture or polar impurities present in a minute amount in a organic solvent.

Example 22

A spherical composite prepared from an iron-containing hybrid nanoporous material was tested on a catalytic reaction in a gaseous mixture having a similar composition in order to confirm whether it has a catalytic activity for the de-$NO_x$ reaction at room temperature in a gas containing nitrogen oxides. The used material is the spherical composite having a diameter of 0.9-1.1 mm and containing an iron trimesate named as MIL-100(Fe)_F, which was prepared in Preparation Example 2 and had the same structure as MIL-100.

The experimental device had a stainless-steel column reactor of an outer diameter of 9.5 mm and a length of 200 mm, to which a gas flow regulator was attached to the front of the reactor in order to control the flow rate of the reactant gas. The change in the composition of the gas after the reaction was analyzed through a NOx analyzer (42C NO—$NO_2$—$NO_x$ Analyzer manufactured by Thermo Environmental) and a mass spectrometer (DSMS manufactured by Hiden), which were connected to the reactor. A thermostat was attached to the reactor to control the pre-treating temperature of the catalyst and the reaction temperature.

In the reactor, 0.5 g of the spherical composite was charged and pretreated before the reaction by flowing a mixed gas of helium containing 900 ppm of NO at 250° C. for 5 hours. Then, the reactor was cooled to 30° C. and the experiment was started. The reaction was carried out at the gas hourly space velocity (GHSV) of the range of 1,000~100,000 per hour and by using, as a reactant, a mixed gas of helium containing 900 ppm of NO, 10% of oxygen and 1% of water. When the reaction was carried out at the conditions of 30° C. and GHSV=2000/h, NO and $NO_2$ were rarely discharged from the outlet of the reactor since only the adsorption is mainly happened during the initial period of about 200 minutes from the start of the reaction.

Example 23

A spherical composite prepared from an iron-containing hybrid nanoporous material was subjected to a liquid-phase catalytic reaction at 70° C. and then to the analysis in order to confirm whether it has a catalytic activity for the Friedel-Crafts benzylation of benzene and benzyl chloride. The used material is the spherical composite prepared in Example 16 having a diameter of 0.9-1.1 mm and containing MIL-100 (Fe)_F.

The experimental device was equipped with a reflux condenser and a 50-mL 3-neck round flask with a mercury thermometer. The reaction mixture was stirred by a magnetic stirrer and controlled to the temperature of 70° C. by a silicone oil bath. As the reactant, 23 ml of benzene containing benzyl chloride in a mol ratio of 1/10 based on the benzene was used, and as the catalyst, 0.3 g of the composite was used. Before the reaction, the spherical composite catalyst was dried at 140° C. in a vacuum oven.

During the reaction, the reaction product was sampled at an interval of 5 minutes during the first 20 minutes, and then at an interval of 10 minutes from next 20 minutes to 60 minutes. The concentration decrease of reactants and the concentration increase of products were determined by using FID-GC (Gas Chromatograph, Donam DS-6200) equipped with a SE-24 column.

If the reaction happens, diphenylmethane and HCl are generated as products and HCl gas is discharged from the reflex condenser. The HCl gas was collected in an Erlenmeyer flask containing a phenolphthalein indicator and an aqueous NaOH solution (0.1N) and then titrated to confirm the concentration. After performing the reaction, it was observed that, after 15 minutes from the beginning of the reaction, the concentration of benzyl chloride as a reactant was rapidly decreased and more than 95% of it was converted to diphenylmethane, and that, after 20 minutes, the conversion rate of benzyl chloride was 100% and the selectivity of diphenylmethane was 99.9%.

Example 24

By using the powder of MIL-125(Ti) prepared in Preparation Example 10, a spherical composite of MIL-125(Ti) was prepared with the same condition and manner as in Example 1.

The powder of MIL-125(Ti) and the spherical composite of MIL-125(Ti) were tested on a hydrothermal stability by measuring the change in the surface area before and after the test and in the adsorption amount to toluene vapor, wherein 2 g of the sample (the powder or the spherical composite) was introduced in a 250 mL beaker containing 100 mL of distilled water, stood for 12 hours, taken out from the beaker and then dried in an oven at 100° C.

The BET surface area was calculated by measuring the physical adsorption isotherms of nitrogen at −196° C., using a TriStar volumetric adsorption apparatus (Micromeritics company). The measurement of the adsorption amount to toluene vapor was performed in the same manner as described in Example 14, and the measurements of the adsorption amount of organic compounds and gases were performed in a thermal gravimetric analyzer (HIDEN four, Intelligent) equipped with a rotary vacuum pump and a turbo pump. Before measuring the BET surface area and the adsorption amount to toluene vapor, the samples were pretreated in a vacuum at 150° C. for 12 hours.

Before the test on the hydrothermal stability, the powder of MIL-125 (Ti) had a BET surface area of 1633 $m^2/g$ and the spherical composite of MIL-125 (Ti) had a BET surface area of 1520 $m^2/g$. After the test on the hydrothermal stability, the powder of MIL-125 (Ti) had a BET surface area of 945 $m^2/g$ and the spherical composite of MIL-125 (Ti) had a BET surface area of 1480 $m^2/g$.

After treated in distilled water for 12 hours, the surface area of the powder of MIL-125 (Ti) was largely decreased to 58% of that before the treatment, but the surface area of the spherical composite of MIL-125 (Ti) was rarely decreased to 97% of that before the treatment. When measured from the adsorption isotherm of the toluene vapor at 30° C. at the partial pressure in the $p/p_0=0.5$ area, the adsorption amount of the toluene onto the powder of MIL-125 (Ti) was 0.53 g per 1 g of the powder, and the adsorption amount of the toluene onto the spherical composite of MIL-125 (Ti) was 0.51 g per 1 g of the composite. After the hydrothermal test and at the same condition, the adsorption amount of the toluene onto the powder of MIL-125 (Ti) was decreased by 45% to result to 0.29 g per 1 g of the powder, and the adsorption amount of the toluene onto the spherical composite of MIL-125 (Ti) was decreased only by 5% to result to 0.49 g per 1 g of the composite.

From the above results, it could be confirmed that the spherical composite manufactured in the present application was very effective in improving the hydrophobicity of hybrid nanoporous material powders having a week hydrothermal stability, and thereby improving hydrothermal stability and minimizing the decrease in the adsorption amount and the adsorption feature.

Example 25

A powder of CuBTC prepared in Preparation Example 1 and a spherical composite of CuBTC prepared in Example 2 were tested on the moisture stability by measuring the change in the strength of X-ray diffraction pattern and the change in the BET surface area after exposed for one month to the condition of the temperature of 25° C. and the relative humidity of 56%.

Before the exposure experiment, the powder of CuBTC had a BET surface area of 1870 $m^2/g$ and the spherical composite of CuBTC had a BET surface area of 1755 $m^2/g$. After the exposure experiment, the powder of CuBTC had a BET surface area of 1403 $m^2/g$ and the spherical composite of CuBTC had a BET surface area of 1680 $m^2/g$.

After exposed to the condition of the relative humidity of 60%, the surface area of the powder of CuBTC was largely decreased to 78% of that before the treatment, but the surface area of the spherical composite of CuBTC was rarely decreased to 95% of that before the treatment. As to the strength of X-ray diffraction pattern and when measuring the strongest peak, the powder of CuBTC resulted to a largely decrease to 40% of that before the treatment, but the spherical composite resulted to a decrease to 84% of that before the treatment, which was a very small decrease when compared with the powder.

From the above results, it could be confirmed that the spherical composite manufactured in the present application was very effective in improving the moisture stability of hybrid nanoporous material powders having a week moisture stability and in minimizing the decrease in the adsorption amount and the adsorption feature.

The above description only explains the technical idea of the present invention, and thus a person having ordinary skill in the art to which the present invention pertains can perform various modification and variation without departing from the essential feature of the present invention. Therefore, Examples described in the present invention are not given for restriction of the technical idea of the present invention, but given for explanation thereof, and the scope of the present invention is not limited by Examples described in the present invention. The scope of protection of the present application should be interpreted by the claims below and all the technical ideas within the equivalent scope should be included in the scope of protection of the present application.

INDUSTRIAL APPLICABILITY

The composite of a crystalline hybrid nanoporous material obtained by the present invention can possess a certain level of structural strength so as to maintain the stability of the framework structure of a crystalline hybrid nanoporous material as well as can possess a high porosity so as to increase the transfer and diffusion velocity of guest molecules; and can maximize the activity of the composite by minimizing a disadvantageous decrease in the specific surface area per weight of the composite, when compared with the specific surface area per weight of the hybrid nanoporous material powder.

The composite of a crystalline hybrid nanoporous material prepared by the present invention can be diversely utilized in the fields of a catalyst, a catalyst support, an absorbent, an adsorbent, a material for separation-recovery, a water controller for removing or drying water or water vapor, a heat pump which can store or transfer heats generated during the adsorption and desorption of gas or liquid materials, an agent for storing gas or liquid materials, an ion exchanger, a material for chromatography, a storing material, a material for producing freshwater, etc.

What is claimed is:

1. A composite comprising at least one crystalline hybrid nanoporous material powder, at least one organic polymeric additive and at least one optional inorganic additive; wherein said crystalline hybrid nanoporous material is prepared by coordinating at least one organic ligand and at least one optional anionic ligand to or with a metal ion or a metal ion cluster to which oxygen is bonded;
characterized by the fact that the composite has a spherical or pseudo-spherical shape and a size of 0.1~100 mm; that the total void volume of the voids is at least 5% by volume based on the sum of the total pore volume of the nanopores having a size of 10 nm or smaller in the composite and the total void volume of the voids having a size of 0.1 μm or larger in the composite; and that the specific surface area per weight (m²/g) of the composite is at least 83% based on the specific surface area per weight (m²/g) of the nanoporous material powder.

2. The opposite according to claim 1, characterized in that the crystallinity index of the composite determined by X-ray diffraction analysis is at least 70% of that of the crystalline hybrid nanoporous material powder contained in the composite.

3. The opposite according to claim 1, characterized in that said organic polymeric additive and said optional inorganic additive are contained in the amount of 0.1~15% by weight based on the weight of the crystalline hybrid nanoporous material powder.

4. The opposite according to claim 1, characterized in that said organic polymeric additive is at least one thermoplastic polymer.

5. The opposite according to claim 1, characterized in that said optional inorganic additive is selected from a group consisting of silica, metal alkoxide and metal halide.

6. The opposite according to claim 1, characterized in that it further comprises at least one void-forming agent which can be removed by the heat between 20~150° C., a chemical reaction, microwaves or ultrasonic waves.

7. The opposite according to claim 1, characterized in that it further comprises at least one functional assisting agent.

8. The opposite according to claim 1, characterized in that said crystalline hybrid nanoporous material has the following Formula 1:

   [Formula 1]

(wherein, M represents at least one metal ion selected from a group consisting of Ti, Zr, V, Cr, Fe, Co, Ni, Cu, Zn, Al, Mg, Ca and Li;
O represents oxygen;
X represents an anion ligand containing at least one anion group selected from a group consisting of $OH^-$, $F^-$, $Cl^-$, $Br^-$, $NO_3^-$, $BF_4^-$, $PF_6^-$, $I^-$, $SO_4^{2-}$, $HCO_3^-$ and $R_nCOO^-$ ($R_n$ represents a $C_1$-$C_6$ alkyl group);
L represents an organic ligand containing at least one organic group selected from a group consisting of carboxylic group (—COOH), an anion of carboxylic acid (-COO⁻), amine group (—NH₂), imino group (>C=NH), nitro group (—NO₂), hydroxyl group (—OH), halogen group (—X) and sulfonic acid group (—SO₃H);
a represents a rational number of 1 to 12;
b represents a rational number of 0 to 6;
c represents a rational number of 0 to 12; and
d represents a rational number of 1 to 12).

9. An article comprising a composite of any one of claims 1 to 8, which is selected from a group consisting of a catalyst, a catalyst support, an absorbent, an adsorbent, a material for separation-recovery, a water controller for removing or drying moisture or water vapor, a heat pump which can store or transfer heats generated during the adsorption and desorption of gas or liquid materials, an ion exchanger, a material for chromatography, a material for storing, a material for producing freshwater.

10. A method for the preparation of a composite characterized in that said method comprises:
a step for coordinating an organic ligand and an optional anionic ligand with a metal ion or a metal ion cluster to which oxygen is bonded, to synthesizing a crystalline hybrid nanoporous material powder;
a step for mixing and stirring said synthesized crystalline hybrid nanoporous material powder, at least one organic polymeric additive, at least one optional inorganic additive, and a solvent to obtain a mixture;
a step for mechanically pulverizing said mixture to obtain a powder lump having a size of 0.1 to 100 mm;
a step for subjecting said shaped powder lump to a heat treatment, a chemical reaction treatment, a microwave or ultrasonic wave treatment to remove the solvent contained in the shaped powder lump.

11. The method according to claim 10, characterized in that the solvent is contained in an amount of 1~300% by weight based on the weight of the crystalline hybrid nanoporous material powder.

12. The method according to claim 10, characterized in that the solvent is water, an organic solvent or a mixture thereof.

13. The method according to claim 10, characterized in that it further comprises:

a step for adjusting the weight of the solvent to control the size of the powder lump.

* * * * *